(12) United States Patent
Doi

(10) Patent No.: US 12,536,312 B2
(45) Date of Patent: Jan. 27, 2026

(54) FILE VIEWING SYSTEM, FILE VIEWING METHOD, AND STORAGE MEDIUM

(71) Applicant: NEC Corporation, Tokyo (JP)

(72) Inventor: Koichiro Doi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/669,820

(22) Filed: May 21, 2024

(65) Prior Publication Data
US 2024/0303355 A1 Sep. 12, 2024

Related U.S. Application Data

(63) Continuation of application No. 17/271,713, filed as application No. PCT/JP2019/033586 on Aug. 27, 2019, now abandoned.

(30) Foreign Application Priority Data

Sep. 3, 2018 (JP) ................ 2018-164213

(51) Int. Cl.
G06F 21/62 (2013.01)
G06F 21/32 (2013.01)
H04N 1/44 (2006.01)

(52) U.S. Cl.
CPC .......... G06F 21/6209 (2013.01); G06F 21/32 (2013.01); H04N 1/442 (2013.01); H04N 1/444 (2013.01); H04N 1/4493 (2013.01)

(58) Field of Classification Search
CPC ..... G06F 21/6209; G06F 21/32; H04N 1/442; H04N 1/444; H04N 1/4493
See application file for complete search history.

(56) References Cited

U.S. PATENT DOCUMENTS

| | | | | |
|---|---|---|---|---|
| 6,111,517 A | * | 8/2000 | Atick | G06V 40/172 340/5.83 |
| 8,132,261 B1 | | 3/2012 | Simpson | G06F 21/6218 726/2 |
| 8,370,639 B2 | * | 2/2013 | Azar | G06F 21/32 713/186 |
| 2003/0078880 A1 | | 4/2003 | Alley | H04L 9/3247 705/38 |

(Continued)

FOREIGN PATENT DOCUMENTS

JP 2003-006185 A 1/2003
JP 2003-141088 A 5/2003
(Continued)

OTHER PUBLICATIONS

Niinuma et al., "Soft Biometric Traits for Continuous User Authentication", Sep. 2010, IEEE Transactions on Information Forensics and Security, vol. 5, No. 4, pp. 771-780 (Year: 2010).*

(Continued)

*Primary Examiner* — Kenneth W Chang
(74) *Attorney, Agent, or Firm* — Sughrue Mion, PLLC

(57) ABSTRACT

Provided is a file viewing system including: a comparison unit that compares biometric information of a comparison target person with biometric information of a person associated with an electronic file; and a viewing prevention unit that performs a process for preventing viewing of the electronic file based on a result of a comparison by the comparison unit.

16 Claims, 15 Drawing Sheets

(56) References Cited

U.S. PATENT DOCUMENTS

| | | | |
|---|---|---|---|
| 2004/0003298 A1 | 1/2004 | Takeshi | G06F 21/84 |
| 2004/0249815 A1* | 12/2004 | Lee | G06Q 30/02 707/999.009 |
| 2005/0144134 A1 | 6/2005 | Hirano | |
| 2005/0262132 A1 | 11/2005 | Morita et al. | |
| 2006/0056664 A1 | 3/2006 | Iwasaki | |
| 2006/0150151 A1 | 7/2006 | Dubinsky | G06F 16/9558 717/114 |
| 2007/0156897 A1 | 7/2007 | Lim | G06Q 10/10 709/225 |
| 2007/0271592 A1 | 11/2007 | Noda | H04L 9/3234 726/1 |
| 2007/0294375 A1 | 12/2007 | Matsubara | H04N 1/32128 709/219 |
| 2008/0192287 A1* | 8/2008 | Iwai | G06F 21/606 358/1.15 |
| 2009/0320035 A1* | 12/2009 | Ahlgren | H04L 67/10 718/104 |
| 2010/0174751 A1* | 7/2010 | Kawano | G06F 21/6218 715/847 |
| 2012/0019456 A1* | 1/2012 | Choi | G06F 3/04847 345/173 |
| 2012/0102543 A1* | 4/2012 | Kohli | H04L 63/20 726/1 |
| 2013/0205367 A1* | 8/2013 | Sambamurthy | H04L 63/20 726/28 |
| 2013/0310011 A1* | 11/2013 | Kim | H04M 1/27475 455/414.1 |
| 2014/0050370 A1 | 2/2014 | Inkumsah | G06F 3/013 382/117 |
| 2014/0123273 A1* | 5/2014 | Matus | H04M 1/66 726/16 |
| 2015/0254469 A1 | 9/2015 | Butler | G06F 21/6218 706/12 |
| 2015/0269389 A1* | 9/2015 | Lee | H04L 63/0861 726/5 |
| 2015/0312227 A1 | 10/2015 | Follis | H04L 9/3247 713/176 |
| 2015/0339486 A1* | 11/2015 | Shetye | H04L 67/10 726/28 |
| 2016/0085950 A1 | 3/2016 | Chen | |
| 2016/0224776 A1 | 8/2016 | Leow | G06F 21/32 |
| 2017/0255786 A1 | 9/2017 | Krishnamurthi | |
| 2019/0080072 A1* | 3/2019 | Van Os | G06F 3/016 |

FOREIGN PATENT DOCUMENTS

| | | |
|---|---|---|
| JP | 2003-208479 A | 7/2003 |
| JP | 2004-178498 A | 6/2004 |
| JP | 2005-115480 A | 4/2005 |
| JP | 2005-115522 A | 4/2005 |
| JP | 2005-190440 A | 7/2005 |
| JP | 2006-012117 A | 1/2006 |
| JP | 2006-114018 A | 4/2006 |
| JP | 2007-052557 A | 3/2007 |
| JP | 2007-115228 A | 5/2007 |
| JP | 2008-003687 A | 1/2008 |
| JP | 2008-181359 A | 8/2008 |
| JP | 2009-080668 A | 4/2009 |
| JP | 2011-076378 A | 4/2011 |
| JP | 2011-221578 A | 11/2011 |
| JP | 2013-045384 A | 3/2013 |
| JP | 2013-228993 A | 11/2013 |
| JP | 2014-178873 A | 9/2014 |
| JP | 2015-073286 A | 4/2015 |
| JP | 2015-226294 A | 12/2015 |
| JP | 2016-130876 A | 7/2016 |
| JP | 2017-027318 A | 2/2017 |
| JP | 2018-084835 A | 5/2018 |

OTHER PUBLICATIONS

International Search Report for PCT Application No. PCT/JP2019/033586, mailed on Nov. 5, 2019.

Japanese Office Action for JP Application No. 2020-541149 mailed on Jan. 25, 2022 with English Translation.

JP Office Action for JP Application No. 2022-132966, mailed on Oct. 12, 2023 with English Translation.

JP Office Action for JP Application No. 2024-061846, mailed on Dec. 10, 2024 with English Translation.

* cited by examiner

FIG. 6

| USER | VIEW | MODIFY |
|---|---|---|
| AAA | ALLOW | ALLOW |
| BBB | ALLOW | |
| CCC | ALLOW | |
| DDD | | |
| EEE | | |
| ⋮ | ⋮ | ⋮ |
| GROUP | VIEW | MODIFY |
| A DIVISION | | |
| B DIVISION | DENY | DENY |
| REGULAR EMPLOYEE | | DENY |
| MANAGER | | |
| ⋮ | ⋮ | ⋮ |

FIG. 7

| USER | FACE IMAGE DATA | FEATURE AMOUNT | AFFILIATION | JOB TITLE |
|---|---|---|---|---|
| AAA | aaa.jpg | aaa.dat | A DIVISION | MANAGER |
| BBB | bbb.jpg | bbb.dat | A DIVISION | REGULAR EMPLOYEE |
| CCC | ccc.jpg | ccc.dat | A DIVISION | REGULAR EMPLOYEE |
| DDD | ddd.jpg | ddd.dat | B DIVISION | MANAGER |
| EEE | eee.jpg | eee.dat | B DIVISION | REGULAR EMPLOYEE |
| ... | ... | ... | ... | ... |

FILE VIEWING SYSTEM, FILE VIEWING METHOD, AND STORAGE MEDIUM

This application is a continuation application of U.S. patent application Ser. No. 17/271,713 filed on Feb. 26, 2021, which is a National Stage Entry of PCT/JP2019/033586 filed on Aug. 27, 2019, which claims priority from Japanese Patent Application 2018-164213 filed on Sep. 3, 2018, the contents of all of which are incorporated herein by reference, in their entirety.

TECHNICAL FIELD

The present invention relates to a file viewing system, a file viewing method, and a storage medium.

BACKGROUND ART

Patent Literature 1, Patent Literature 2, and Patent Literature 3 disclose various technologies for achieving security protection by utilizing biometric recognition technologies such as face recognition. In the technologies of Patent Literature 1, Patent Literature 2, and Patent Literature 3, a process for restricting a use of a device is performed based on a result of face recognition.

CITATION LIST

Patent Literature

PTL 1: Japanese Patent Application Laid-open No. 2003-141088
PTL 2: Japanese Patent Application Laid-open No. 2006-114018
PTL 3: Japanese Patent Application Laid-open No. 2015-226294

SUMMARY OF INVENTION

Technical Problem

In applying the security protection technology using biometric recognition as exemplified in Patent Literature 1, Patent Literature 2, and Patent Literature 3 to a security protection of electronic files, there is room for improving convenience.

The present invention has been made in view of the above problem and intends to provide a file viewing system, a file viewing method, and a storage medium with improved convenience in a security protection of electronic files.

Solution to Problem

According to one example aspect of the present invention, provided is a file viewing system including: a comparison unit that compares biometric information of a comparison target person with biometric information of a person associated with an electronic file; and a viewing prevention unit that performs a process for preventing viewing of the electronic file based on a result of a comparison by the comparison unit.

According to another example aspect of the present invention, provided is a file viewing method including: comparing biometric information of a comparison target person with biometric information of a person associated with an electronic file; and performing a process for preventing viewing of the electronic file based on a result of the comparison.

According to yet another example aspect of the present invention, provided is a storage medium in which a program is stored, the program causing a computer to execute a file viewing method including: comparing biometric information of a comparison target person with biometric information of a person associated with an electronic file; and performing a process for preventing viewing of the electronic file based on a result of the comparison.

Advantageous Effects of Invention

According to the present invention, it is possible to provide a file viewing system, a file viewing method, and a storage medium with improved convenience in a security protection of electronic files.

BRIEF DESCRIPTION OF DRAWINGS

FIG. 6 is a table illustrating an example of authority information set on an electronic file.

FIG. 7 is a table illustrating an example of registration information.

DESCRIPTION OF EMBODIMENTS

Exemplary example embodiments of the present invention will be described below with reference to the drawings. Throughout the drawings, the same components or corresponding components are labeled with the same reference, and the description thereof may be omitted or simplified.

First Example Embodiment

A file viewing system according to the present example embodiment will be described with reference to FIGS. 1 to 13. The file viewing system of the present example embodiment is a system for a user to view an electronic file. The file viewing system of the present example embodiment also has a function for determining viewing authority of a user by biometric recognition using biometric information such as a face image, a feature amount generated from the face image, or the like, and for performing a process of preventing a user who does not have viewing authority from viewing the electronic file.

Note that the type of contents of the electronic files that are subject to viewing in the present example embodiment is not particularly limited. The contents may include, for example, documents, spreadsheets, presentation slides, drawings, program codes, videos, or the like. The file viewing system also has a viewing software (viewer) used to display these contents.

The biometric recognition of the present example embodiment is, as an example, face recognition that uses a face image as biometric information, but the biometric recognition may be other biometric recognitions. Other examples may include iris recognition using an iris pattern, auricular recognition using a shape of an auricle, or the like. However, in consideration of the ease of obtaining biometric information when viewing an electronic file, recognition accuracy, or the like, it is desirable that the biometric recognition in the present example embodiment is face recognition. In the following description, face recognition is assumed to be used for biometric recognition except as otherwise noted.

Figure 1:
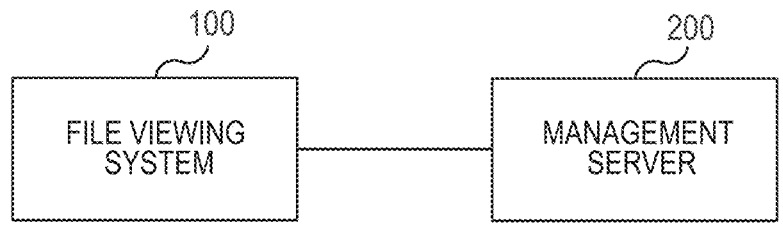
FIG. 1 is an entire configuration diagram of a network including a file viewing system in the first example embodiment.

FIG. 1 is an entire configuration diagram of a network including a file viewing system according to the present example embodiment. The network may be, for example, an internal local area network (LAN). As illustrated in FIG. 1, the network includes a file viewing system 100 and a management server 200 communicatively connected to each other.

The file viewing system 100 may include a device that a user can use to view electronic files, and may be a computer such as a desktop personal computer (PC), a notebook PC, a tablet PC, or the like. The management server 200 is, for example, a server for performing authority information management of a user accessing the file viewing system 100 or the network, recording of face images for face recognition, or the like.

Note that the network may further include, for example, a data server for storing electronic files used by the user for business or the like, or a mail server for exchanging electronic files, messages, or the like with other users. Alternatively, the management server 200 may further include a data server function, a mail server function, or the like.

For example, if the network is a corporate backbone system, the file viewing system 100 may be an end user terminal and the management server 200 may be a user management server.

Figure 2:
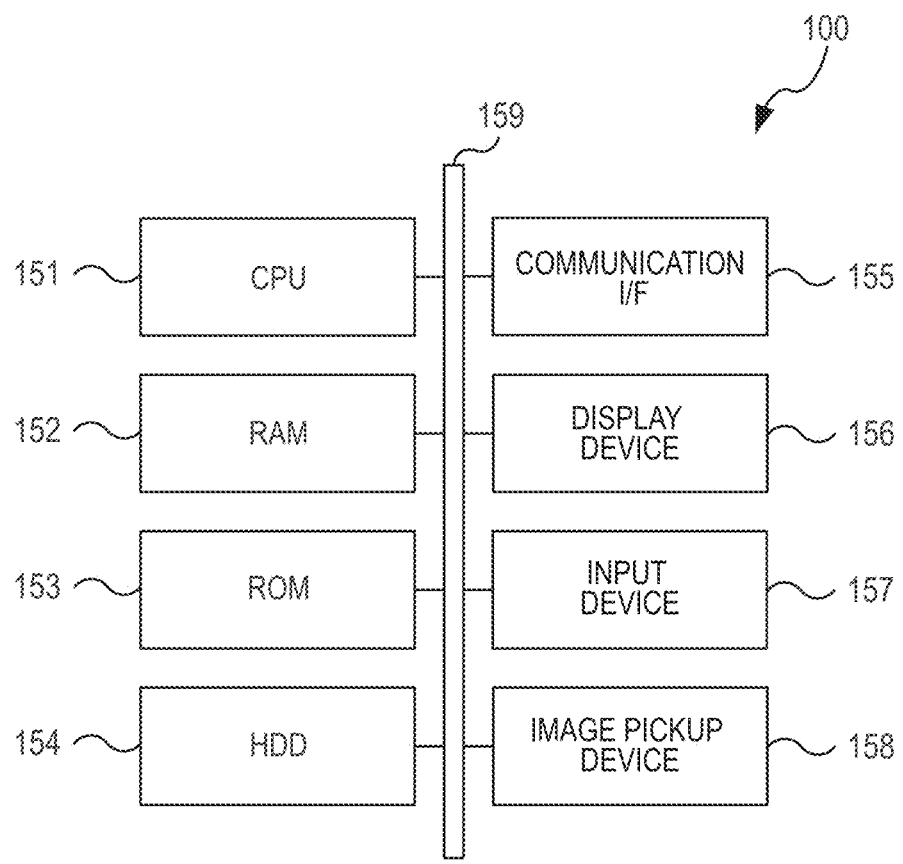
FIG. 2 is a block diagram illustrating a hardware configuration example of the file viewing system according to the first example embodiment.

FIG. 2 is a block diagram illustrating a hardware configuration example of the file viewing system 100. As a computer that performs calculation, control and storage, the file viewing system 100 has a central processing unit (CPU) 151, a random access memory (RAM) 152, a read only memory (ROM) 153, and a hard disk drive (HDD) 154. Further, the file viewing system 100 has a communication interface (I/F) 155, a display device 156, an input device 157, and image pickup device 158. The CPU 151, the RAM 152, the ROM 153, the HDD 154, the communication I/F 155, the display device 156, the input device 157, and image pickup device 158 are connected to each other via a bus 159. Note that the display device 156, the input device 157, and the image pickup device 158 may be connected to the bus 159 via a driving device (not illustrated) for driving these devices.

While respective components forming the file viewing system 100 are illustrated as an integrated device in FIG. 2, a part of these functions may be provided by external devices. For example, the display device 156, the input device 157, and the image pickup device 158 may be external devices different from parts constituting functions of a computer including the CPU 151 or the like.

The CPU 151 is a processor that has the function of performing a predetermined calculation according to a program stored in the ROM 153, the HDD 154, or the like and controlling respective components of the file viewing system 100. The RAM 152 is formed of a volatile memory and provides a temporal memory region necessary for the operation of the CPU 151. The ROM 153 is formed of a non-volatile memory and stores necessary information such as a program used for the operation of the file viewing system 100. The HDD 154 is formed of a non-volatile memory, and is a storage device that stores data necessary for processing, a program for operation of the file viewing system 100, or the like.

The communication I/F 155 is a communication interface based on a standard such as Ethernet (registered trademark), Wi-Fi (registered trademark), 4G, or the like, which is a module used for communicating with other devices. The display device 156 is a liquid crystal display, an organic light emitting diode (OLED) display, or the like and used for displaying a content of an electronic file, a graphical user interface (GUI), or the like. The input device 157 is a keyboard, a pointing device, or the like by which the user operates the file viewing system 100. Examples of the pointing device include a mouse, a trackball, a touch panel, a pen tablet, or the like. The display device 156 and the input device 157 may be integrally formed as a touch panel.

The image pickup device 158 is a device such as a digital camera that captures an object to generate an electronic data of a still image or a video. The image pickup device 158 includes an image pickup element such as a complementary metal oxide semiconductor (CMOS) image sensor, a control circuit, a signal processing circuit, or the like. The image pickup device 158 is arranged at a position where the user who uses the file viewing system 100 is included within a capturing range. For example, the image pickup device 158 may be arranged in the outer frame of the display area of the display device 156. Thus, it is possible to capture a face image of the user who tries to use the file viewing system 100 and is looking at the display device 156.

Note that the hardware configuration illustrated in FIG. 2 is an example, and a device other than the above may be added, or some of the devices may not be provided. Further, some of the devices may be replaced with another device having a similar function. Further, some of the functions of the present example embodiment may be provided by another device via a network, or the functions of the present example embodiment may be distributed in a plurality of devices for implementation. For example, the HDD 154 may be replaced with a solid state drive (SSD) using a semiconductor memory or may be replaced with a cloud storage.

Figure 3:
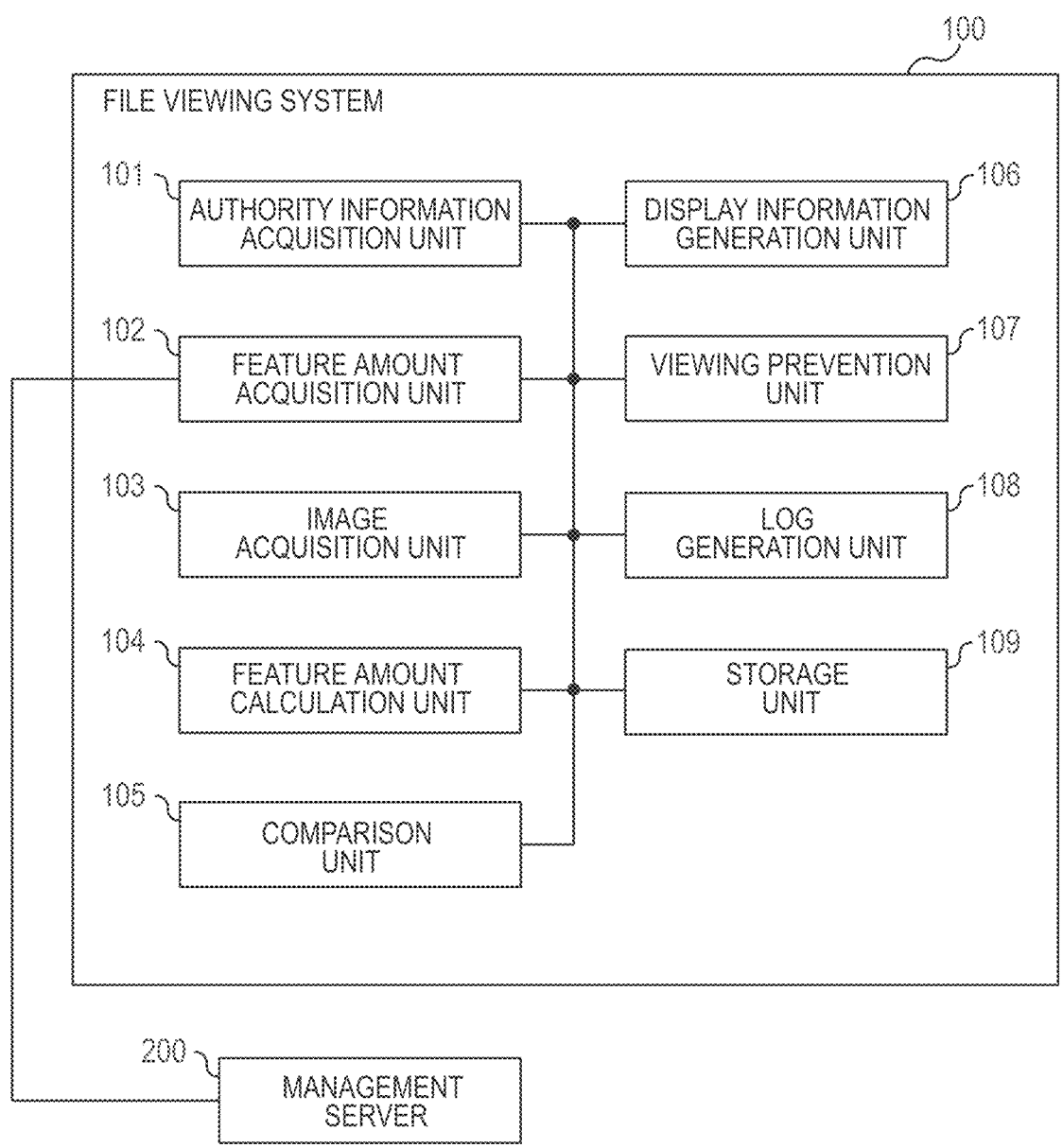
FIG. 3 is a function block diagram of the file viewing system according to the first example embodiment.

FIG. 3 is a function block diagram of the file viewing system 100 according to the present example embodiment. the file viewing system 100 has an authority information acquisition unit 101, a feature amount acquisition unit 102, an image acquisition unit 103, a feature amount calculation unit 104, a comparison unit 105, a display information generation unit 106, a viewing prevention unit 107, a log generation unit 108, and a storage unit 109.

The CPU 151 loads and executes a program stored in the ROM 153 or the HDD 154 to the RAM 152. Thus, the CPU 151 implements functions of the authority information acquisition unit 101, the feature amount calculation unit 104, the comparison unit 105, the display information generation unit 106, the viewing prevention unit 107, and the log generation unit 108. The CPU 151 implements functions of the feature amount acquisition unit 102 by controlling the communication I/F 155 based on the program. The CPU 151 implements functions of the image acquisition unit 103 by controlling the image pickup device 158 based on the program. The CPU 151 implements functions of the storage unit 109 by controlling the HDD 154 based on the program. The specific process performed in each of these units will be described later.

Figure 4:
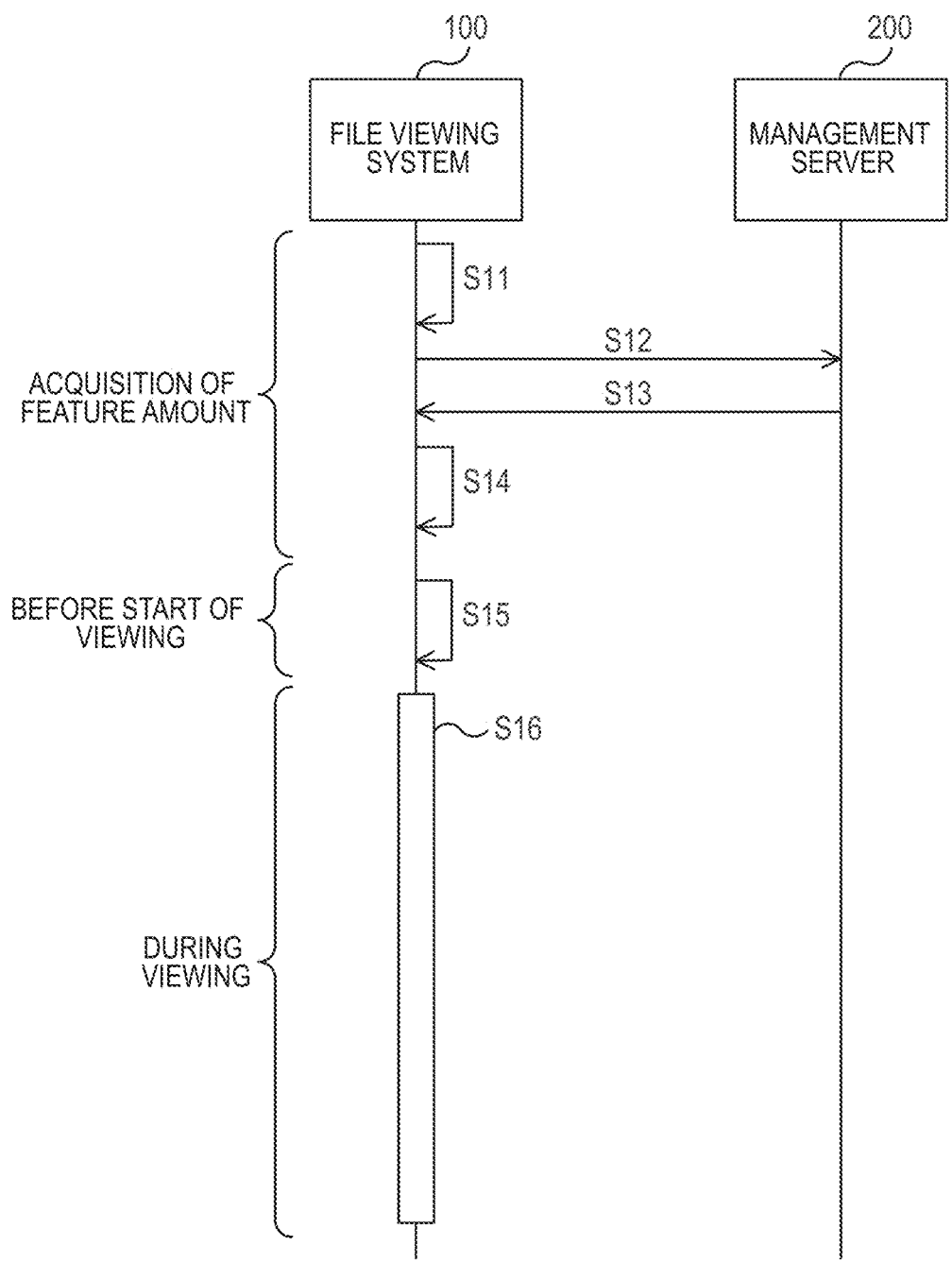
FIG. 4 is a sequence chart illustrating a process according to the first example embodiment.

FIG. 4 is a sequence chart illustrating an outline of the process performed by the file viewing system 100 according to the present example embodiment. This process is started when the user performs an operation for viewing an electronic file to the file viewing system 100. Specifically, when the user performs an operation for opening the electronic file on the viewing software, this process is started. Therefore, it is not essential to perform this process all the time while the file viewing system 100 is activated. First, with reference to FIG. 4, the outline of the processing performed by the file viewing system 100 will be described.

Step S11 to step S14 are processes for acquiring feature amounts used for face recognition. In step S11, the file viewing system 100 refers to authority information associated with the electronic file that the user intends to view and specifies a range of persons who can view the file. Since the user is a target of the face recognition, the user may be more generally referred to as a comparison target person.

In step S12, the file viewing system 100 transmits a signal for requesting the management server 200 to provide a feature amount in order to acquire a feature amount of a face image of a person who can view the electronic file. In step S13, the management server 200 transmits the feature amount requested from the file viewing system 100 to the file viewing system 100.

In step S14, the file viewing system 100 captures a face image of the user who intends to view the electronic file, and generates a feature amount from the face image.

Step S15 is a face recognition process executed before the user starts viewing of the electronic file. In step S15, the file viewing system 100 compares the feature amount generated from the face image of the user with the feature amount, provided from the management server 200, of the face image of the person who can view the electronic file. When the user is a person who can view the electronic file, the content of the electronic file is displayed in a display area of the display device 156, and the user can view the electronic file. When the user is not a person who can view the electronic file, a process for preventing viewing of the electronic file is performed.

Step S16 is a face recognition process executed while the user views the electronic file. The file viewing system 100 repeatedly acquires the face image of the user and repeatedly performs face recognition at predetermined intervals during a period when the electronic file can be viewed. When a person who is not a person who can view the electronic file is detected by the face recognition, or when the user is absent, a process for preventing viewing of the electronic file is performed.

Figure 5:
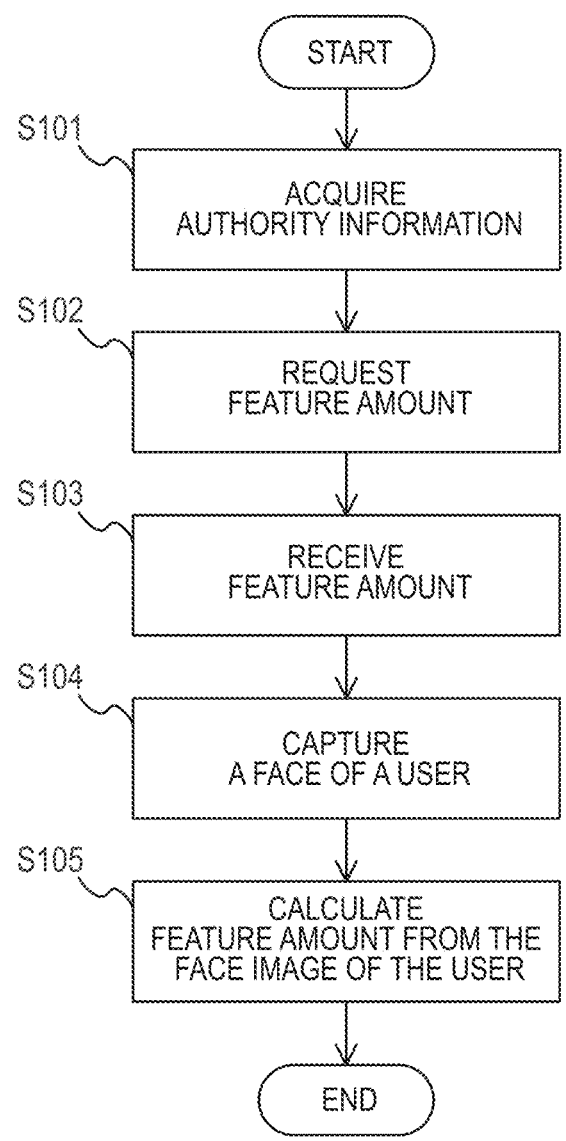
FIG. 5 is a flowchart illustrating a process of acquiring a feature amount performed by the file viewing system according to the first example embodiment.

Next, the process of acquiring the feature amount, the process before the start of viewing, and the process during viewing illustrated in FIG. 4 will be described in more detail. FIG. 5 is a flowchart illustrating the process of acquiring the feature amount performed by the file viewing system 100.

Step S101 in FIG. 5 corresponds to step S11 in FIG. 4. In step S101, the authority information acquisition unit 101 refers to the authority information associated with the electronic file that the user intends to view and specifies the range of persons who can view the electronic file. Here, the authority information is set for each electronic file, and different authorities can be set for each electronic file depending on importance, confidentiality, or the like. This authority information is typically held in the electronic file, but may be stored in a separate file.

FIG. 6 is a table illustrating an example of authority information set on the electronic file. The authority can be set for each user or for each group to which the user belongs. The user is set with a name capable of identifying the individual such as a person's name, an employee number, or the like. The types of the groups may be, for example, affiliations such as "A division" and "B division" and job titles such as "Regular employee" and "Manager" illustrated in FIG. 6. The correspondence between the user and the group may be set in the electronic file or may be stored in the management server 200. In this example, it is assumed that the correspondence between the user and the group is stored in the management server 200.

Settable authorities may be "View", "Modify", or the like, as illustrated in FIG. 6. "View" indicates the authority to view the electronic file, and "Modify" indicates the authority to modify, such as editing, adding, deleting, or the like, the content in the electronic file. The authority of "Allow" or "Deny" can be set for each user and each group. For example, as illustrated in FIG. 6, "Allow" is set on "View" and "Modify" of the user "AAA", and thus the user "AAA" has "View" and "Modify" authority. On the other hand, the user "DDD" has neither "View" nor "Modify" authority.

If the authority is set for the group, the same authority is set for all users belonging to the group. In addition, "Deny" indicates that the user does not have authority. There is a case where "Allow" is set for a certain user, but "Deny" is set for a group to which the certain user belongs. As described above, when both "Allow" and "Deny" are set for one user, "Deny" has priority. That is, in the example illustrated in FIG. 6, even if "Allow" is individually set for a user belonging to the B division, the "Deny" of the group has priority, and therefore the user belonging to the B division does not have the authority of "View" and "Modify".

In the example of FIG. 6, the user "AAA", the user "BBB", and the user "CCC" have the viewing authority of the electronic file. Accordingly, the authority information acquisition unit 101 specifies the user "AAA", the user "BBB", and the user "CCC" as persons who can view the electronic file.

Step S102 in FIG. 5 corresponds to step S12 in FIG. 4. In step S102, in order to acquire the feature amount of the face image of the person who can view the electronic file, the feature amount acquisition unit 102 transmits the signal requesting the management server 200 to provide the feature amount. In the example of FIG. 6, the feature amount acquisition unit 102 requests to provide the feature amounts of the user "AAA", the user "BBB", and the user "CCC".

Note that, in step S102, the authority information set in the group can be transmitted to the management server 200. This is because, when the authority of the user and the authority of the group are intermingled, and the correspondence between the group and the user is managed not by the file viewing system 100 but by the management server 200, the presence or absence of the viewing authority of the user needs to be determined by the management server 200. In this case, the management server 200 specifies a person who can view the electronic file based on the received information.

FIG. 7 is a table illustrating an example of user registration information stored in the management server 200. As illustrated in FIG. 7, the management server 200 stores face image data, feature amounts, and the like in association with the user. The management server 200 also stores information indicating attributes of the user such as an affiliation and a job title of the user in association with the user.

Step S103 in FIG. 5 corresponds to step S13 in FIG. 4. In step S103, the management server 200 transmits a feature amount "aaa.dat", a feature amount "bbb.dat", and a feature amount "ccc.dat" corresponding to the user "AAA", the user "BBB", and the user "CCC" to the file viewing system 100. The feature amount acquisition unit 102 receives the feature amount "aaa.dat", the feature amount "bbb.dat", and the feature amount "ccc.dat" of the electronic file from the management server 200, to acquires these feature amounts. The acquired feature amounts are stored in the storage unit 109.

Step S104 and step S105 in FIG. 5 correspond to step S14 in FIG. 4. In step S104, the image acquisition unit 103 controls the image pickup device 158 to capture the front of the display area of the display device 156 so as to include the face of the user. The storage unit 109 stores the face image acquired by the capturing.

In step 105, the feature amount calculation unit 104 calculates the feature amount from the face image. The calculation process of the feature amount may be, for example, a process of detecting a face region from a face image and calculating positions of feature points such as eyes and mouth corners included in the face region as feature amounts. A storage unit 109 stores the feature amounts acquired by the capturing.

Note that, in step 103, the management server 200 may transmit face image data instead of the feature amount. In this case, by adding a process for calculating the feature amount from the face image data in the authority information acquisition unit 101, the feature amount can be acquired, and the same comparison process can be performed. In step 103, the management server 200 may transmit both the feature amount and the face image data.

Further, in FIG. 5, the order of the process from steps S101 to S103 and the process in steps S104 and S105 may be reversed.

Figure 8:
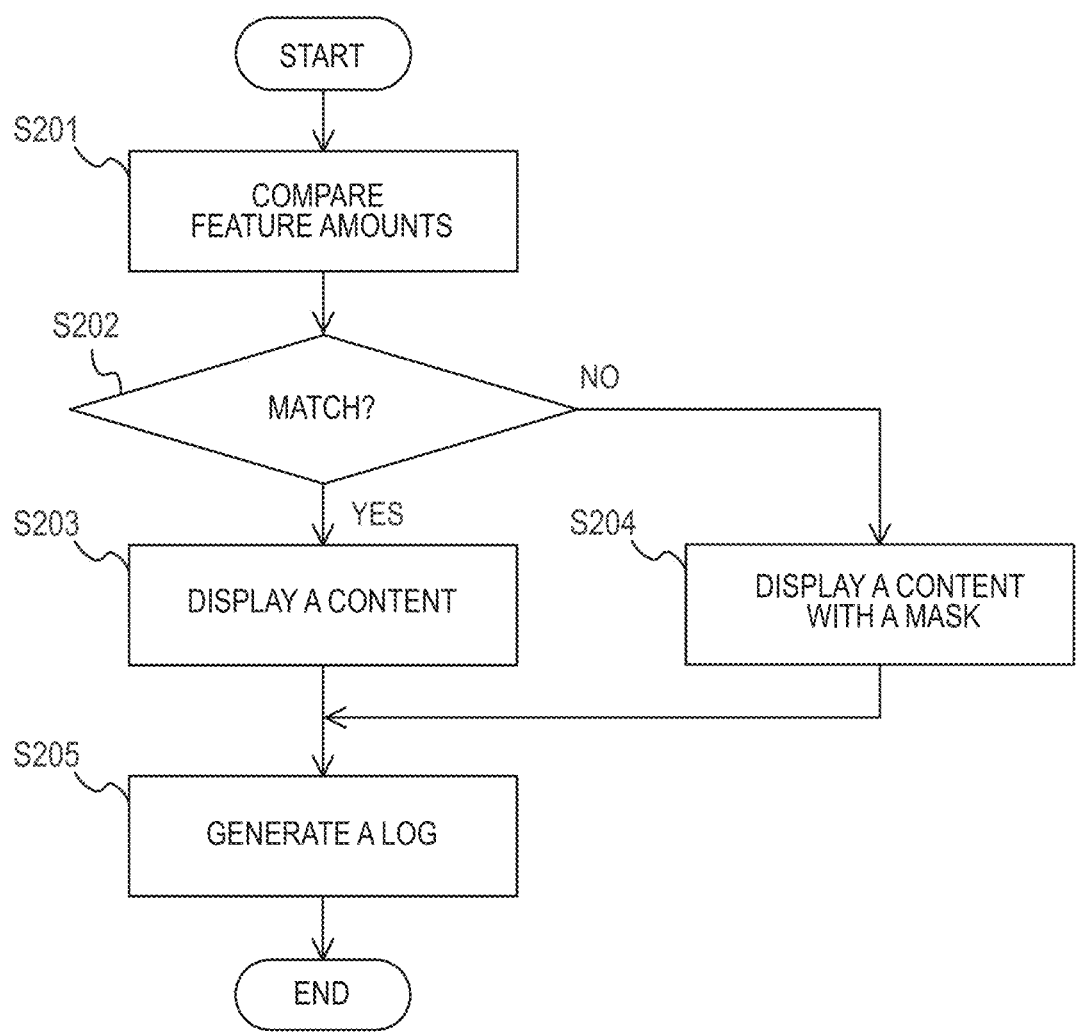
FIG. 8 is a flowchart illustrating a process performed before the start of viewing by the file viewing system according to the first example embodiment.

FIG. 8 is a flowchart illustrating the face recognition process performed by the file viewing system 100 before the start of viewing. Step S201 to step S205 illustrated in FIG. 8 correspond to step S15 in FIG. 4.

In step S201, the comparison unit 105 compares the feature amount of the user acquired in step S103 with the feature amounts of the viewing authority holders acquired in step S105. If the feature amount of the user matches one of the feature amounts of the viewing authority holders in this comparison (step S202, YES), the process proceeds to step S203. If the feature amount of the user does not match any of the feature amounts of the viewing authority holders (step S202, NO), the process proceeds to step 204. In the same manner as in the case where the comparison fails due to such reasons as the user has left or the user is facing sideways, the process proceeds to step 204.

In step S203, the display information generation unit 106 generates display information for displaying the content of the electronic file in the display area of the display device 156. The display device 156 displays the display information in a display area. Thus, the user can view the content.

In step S204, the viewing prevention unit 107 performs process for preventing viewing of the electronic file. Specifically, this processing is realized by displaying a mask pattern overlaid on the content that prevents the content from being viewed.

Figure 9:
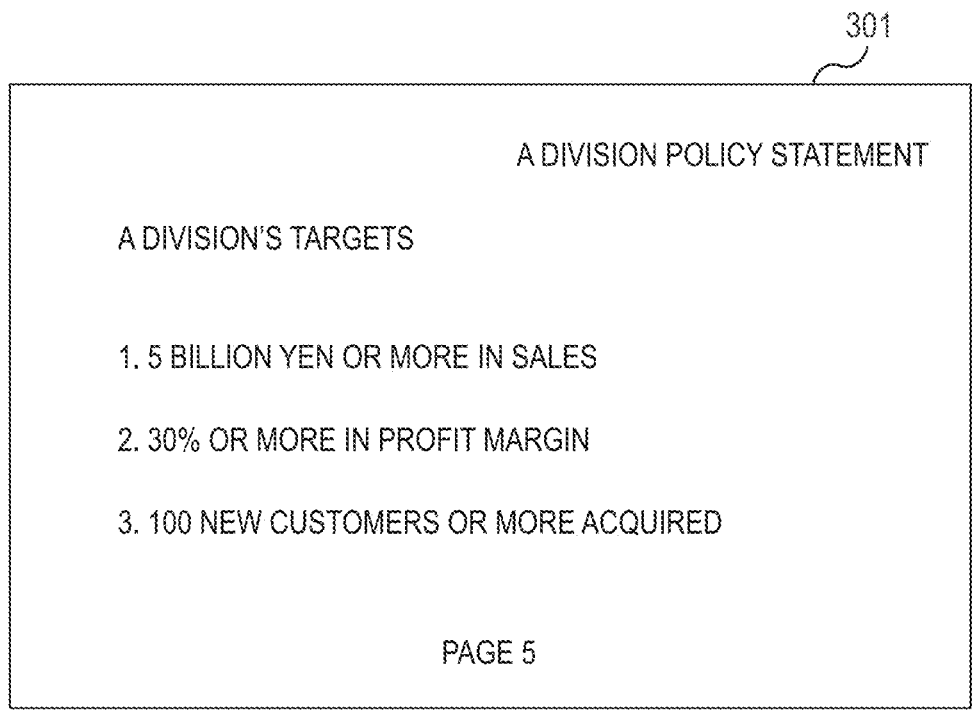
FIG. 9 is a diagram illustrating an example of the electronic file.

Referring to FIGS. 9 to 12, a display example of the mask pattern in step 204 will be described. FIG. 9 is a diagram illustrating an example of the content of the electronic file. FIG. 9 illustrates, as an example of the content, the fifth page of a slide 301 of a presentation of A division policy statement. In step S 203, when the displaying process is performed, the display area of the display device 156 displays the slide 301 as illustrated in FIG. 9.

Figure 10:
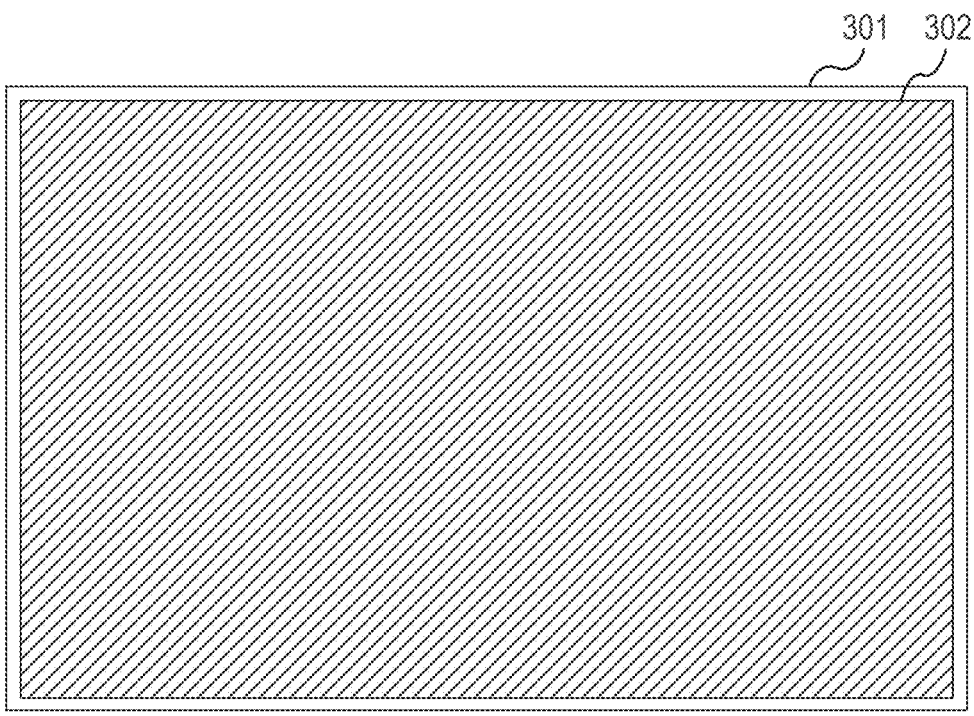
FIG. 10 is a diagram illustrating a display example of a mask pattern.
Figure 11:
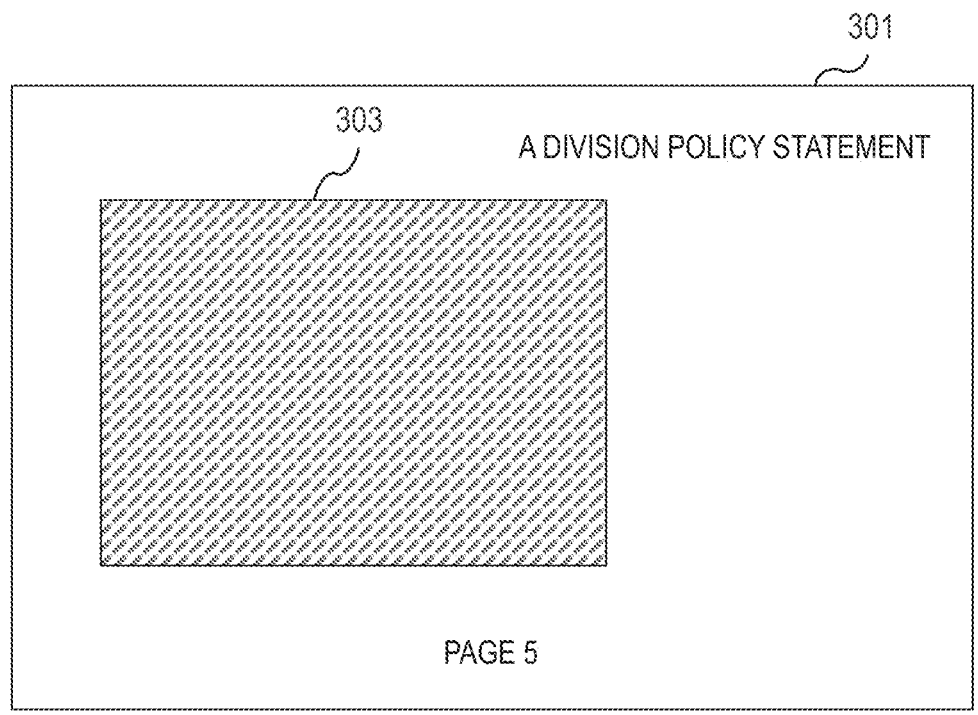
FIG. 11 is a diagram illustrating a display example of the mask pattern.
Figure 12:
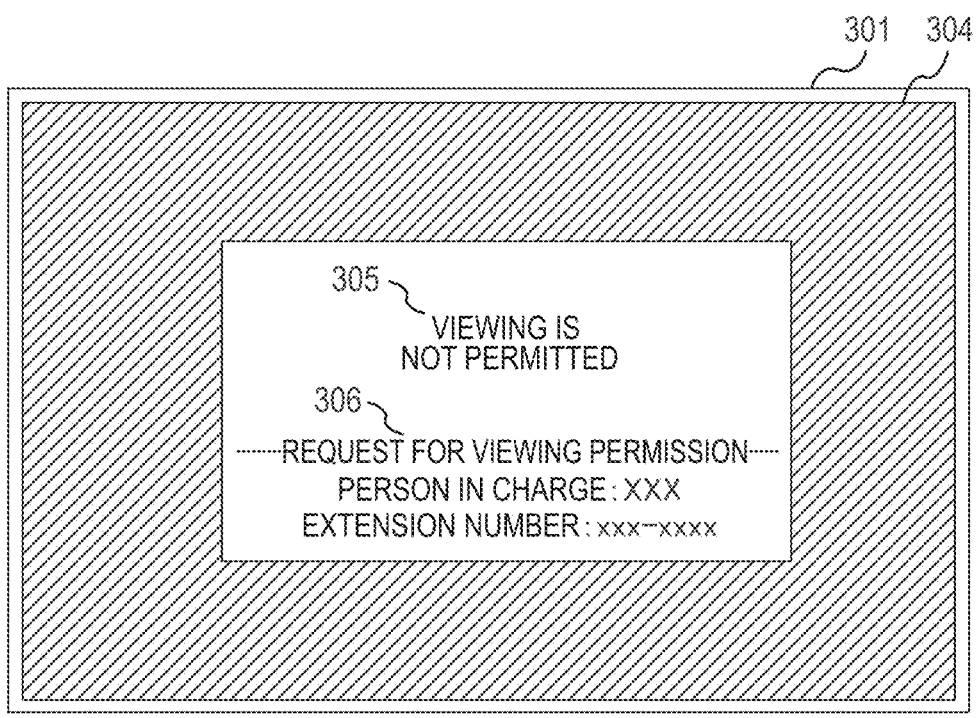
FIG. 12 is a diagram illustrating a display example of the mask pattern.

FIGS. 10 to 12 are diagrams illustrating display examples of the mask patterns. FIG. 10 illustrates an example of the slide 301 displayed in the display area of the display device 156 after the process of step S204. As illustrated in FIG. 10, a mask pattern 302 is displayed on the slide 301. This prevents viewing of the slide 301. A color, a pattern, or the like of the mask pattern 302 is not particularly limited as long as the slide 301 cannot be viewed. For example, the mask pattern 302 may be a hatching pattern as illustrated in FIG. 10, and may be a solid color such as black. However, it is desirable that the mask pattern 302 be clearly different from the design of the slide 301 so that the user can recognize that he or she does not have the viewing authority.

FIG. 11 illustrates another example of the mask pattern. In this example, the content includes a first portion to which the viewing restriction is applied and a second portion to which the viewing restriction is not applied. The mask pattern 303 is arranged so as to overlap only the first portion. In the example of FIG. 11, only the second portion having low confidentiality, such as "A division policy statement" and "page 5", can be viewed, and the first portion having high confidentiality, such as "A division's targets", is limited to be viewed by the mask pattern 303. As described above, according to this example, the viewing restriction can be performed by distinguishing a portion to be masked from a portion not to be masked in accordance with the degree of confidentiality or the like.

Note that the first portion and the second portion may be set in a page basis. For example, the mask pattern 302 as illustrated in FIG. 10 may be displayed on the fifth page with high confidentiality, and the mask pattern may not be displayed on other pages. The first and second portions may be set in a sentence basis or a word basis. For example, if a customer's trade secret is included in a particular sentence in a document, only that sentence may be set as the first portion. Further, for example, when a specific word such as a numerical part of the sales amount or the name of a customer has a high degree of confidentiality, only the specific word may be set as the first part.

Further, the ranges of the first portion and the second portion may be different for each user. In this case, the viewable range can be changed to a multistage range for each user. Thus, even when the viewable range is changed for a plurality of users, the same file can be distributed and convenience is improved. The risk of erroneous distribution is reduced as compared with the case of distributing different file for each user. Even if an erroneous distribution occurs, the user who received the erroneously distributed file does not usually have the authority, so that the possibility that the confidential information is seen at the time of misdistribution is reduced.

FIG. 12 illustrates yet another example of the mask pattern. In this example, mask pattern 304 includes messages 305 and 306. As illustrated in FIG. 12, the message 305 is a character of "Viewing is not permitted" and presents information indicating that the viewing of the electronic file is not permitted to the user. By displaying the message 305, information can be presented to the user such that the user can more surely recognize that the user does not have viewing authority.

The message 306, as illustrated in FIG. 12, is a phrase "Request for viewing permission" and the name and extension number of the person in charge to request, and provides the user with contact information for requesting viewing of the electronic file. By displaying the message 306, not only the fact that the viewing is restricted, but also the contact information can be presented to the user who wants to release the viewing restriction.

Note that the process of preventing viewing of the electronic file by the viewing prevention unit 107 may be a process other than the displaying of the mask pattern. For example, the content may be hidden by controlling viewing software that displays the content of the electronic file, or the display area may be hidden by controlling the display device 156. Further, the entire file viewing system 100 may be controlled to shut down the file viewing system 100 or the like to prevent displaying. However, from the viewpoint of minimizing the work interference to the user, it is desirable that the mask pattern is overlapped. Further, since the process of overlapping the mask patterns can be realized without changing the process of the viewing software, there is an advantage that the conventional viewing software can be used.

In step S205, the log generation unit 108 generates a log indicating that the electronic file has been viewed. The generated log is stored in the storage unit 109. Here, the log may include information such as the user who viewed, hardware identification information of the file viewing system 100, the file name of the electronic file, the viewed date and time, the presence or absence of editing, the presence or absence of the masking, and the like. Note that the log may be generated for each electronic file, or a common log may be generated for a plurality of electronic files. The generated log may be transmitted to the management server 200. In this case, the management server 200 can collectively manage the viewing records of the electronic files.

Figure 13:
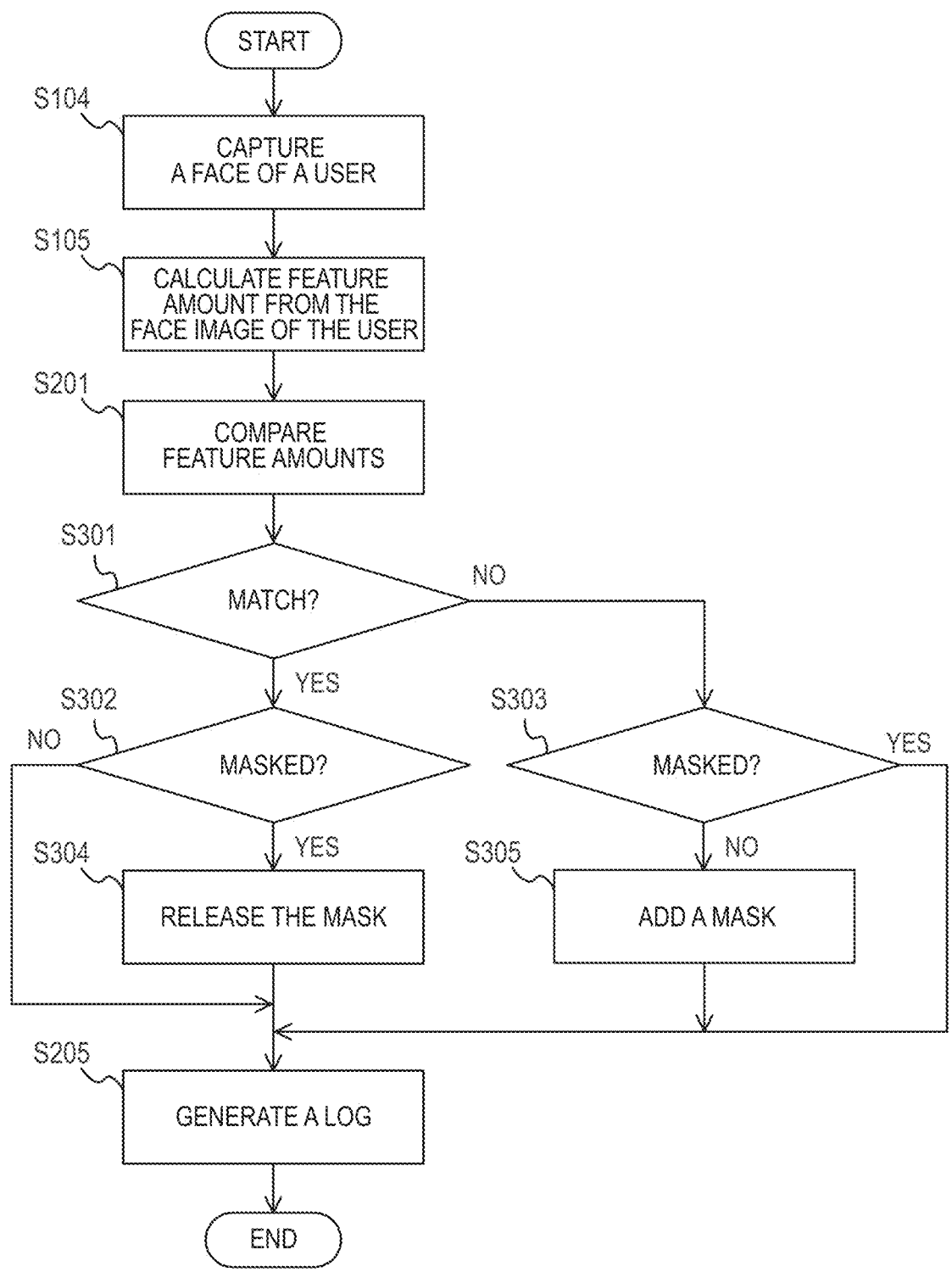
FIG. 13 is a flowchart illustrating a process performed during viewing by the file viewing system according to the first example embodiment.

FIG. 13 is a flowchart illustrating the process of face recognition during viewing performed by the file viewing system 100. The series of processes illustrated in FIG. 13 indicates 1 cycle of face recognition repeatedly performed in step S16 of FIG. 4. The frequency at which the process illustrated in FIG. 13 is performed during viewing is not particularly limited, and may be, for example, a fixed frequency such as 1 time per 1 second, a frequency that varies depending on the degree of confidentiality of the user or the electronic file, or a frequency depending on the processing speed of face recognition.

Since the processes of steps S104 and S105 in FIG. 13 are the same as the processes of steps S104 and S105 in FIG. 5, the descriptions thereof are omitted or simplified. Further, since the processes of steps S201 and S205 in FIG. 13 are the same as the processes of steps S201 and S205 in FIG. 8, the descriptions thereof are omitted or simplified.

Note that the comparison in step S201 may be, for example, similar to the process in FIG. 8, for comparing the feature amount of the user captured in step S104 with the feature amount of the plurality of viewing authority holders. However, it is not essential that the comparison illustrated in FIG. 13 be performed on all the viewing authority holders, and for example, the feature amount of the user captured in step S104 may be compared on a one-to-one basis with the feature amount of the viewing authority holder specified at the comparison before the start of viewing. This is because, in general, there are few cases in which the viewer of an electronic file is changed in the middle, and when the viewer is changed, it is acceptable to treat the changed viewer as a person who does not have the authority to view the electronic file. In this method, since the number of times of comparison can be reduced, the comparison speed can be improved. In this configuration, the identification of the viewing authority holder at the time of comparison before the start of viewing may be performed by a method other than face recognition. For example, the identification may be performed by inputting an identification (ID) number and a password, or may be performed by using a medium on which ID information is recorded such as an employee ID card.

In the comparison in step S201, when the feature amount of the user matches any of the feature amounts of the viewing authority holder (step S301, YES), the process proceeds to step S302. If the feature amount of the user does not match any of the feature amounts of the viewing authority holder (step S301, NO), the process proceeds to step S303. In the same manner as in the case where the matching fails due to such reasons as the user has left or the user is facing sideways, the process proceeds to step S303.

In step S302, if the viewing prevention unit 107 has already performed the process of preventing viewing of the electronic file (displaying the mask, or the like) (step S302, YES), the process proceeds to step S304. If the process of preventing viewing of the electronic file is not performed (step S302, NO), the process proceeds to step S205.

In step S304, the viewing prevention unit 107 releases the process of preventing viewing of the electronic file. Thus, the user can view the content.

In step S303, if the viewing prevention unit 107 has already performed the process of preventing viewing of the electronic file (displaying the mask, or the like) (step S303, YES), the process proceeds to step S205. If the process of preventing viewing of the electronic file is not performed (step S303, NO), the process proceeds to step S305.

In step S305, the viewing prevention unit 107 performs the process to prevent the viewing of the electronic file. Since the details of the specific process are the same as those in step S204 of FIG. 8, the description thereof is omitted.

The process of face recognition during viewing illustrated in FIG. 13 is not essential. However, by performing this process, when the user leaves his/her seat after the comparison at the start of viewing, when the user is not looking at the display device 156 to do another work, or when the user is facing another person due to a reception of a visitor, or the like, the content is automatically hidden. Therefore, the security is improved. Note that, if it is possible to detect a viewing state such as a state in which the user leaves his/her seat after the comparison at the time of starting viewing, a state in which the user is not looking at the display device 156 to do another work, or a state in which he or she is facing another person due to a reception of a visitor, or the like, an effect of security improvement can be similarly obtained even when a method other than face recognition is used. As an example of such a method, there is a method of determining the viewing state based on whether or not a face of a person such as a user is detected in an image by applying a face detection technique to the captured image. Further, a face direction detection may be added to the face detection.

As described above, according to the present example embodiment, whether or not to allow viewing is determined by biometric recognition using biometric information associated with the electronic file. Thus, a setting such as a user who is allowed to view, a user who is not allowed to view, or the like can be set in detail for each electronic file. Accordingly, a file viewing system with improved convenience in a security protection of electronic files is provided.

In the present example embodiment, since the whether or not to allow viewing is determined by face recognition, the user's operation burden is reduced and convenience is improved as compared with the method of setting a password on an electronic file and allowing the user to input the password. In particular, in the case of an application in which an electronic file is opened many times, if a password authentication is employed, a labor of inputting the password is required every time the file is opened, but such a labor is not required in the present example embodiment. Also, the risk of the leakage of the password is eliminated by not using the password. Further, since it is not necessary for the side distributing the electronic file to separately notify the password, convenience is improved. Although there is a method of setting a decompression password at the time of compressing an electronic file, and there is a problem that the viewing restriction is lost after the decompression by this method, in the present example embodiment, since the setting is made in the electronic file itself, such a problem does not occur. In the case where security is emphasized, password authentication may be used together with the biometric recognition of the present example embodiment.

Further, the user can generate an electronic file suitable for the process of the present example embodiment only by creating the content in the same manner as usual and performing an existing authority provision by the right managing services (RMS) to the electronic file including the created content. Therefore, in the present example embodiment, it is not necessary to prepare an electronic file of an original format, a dedicated viewer, or the like. Further, the user can distribute the electronic file by a conventional method such as an attachment on an electronic mail or uploading to a server. Therefore, the burden on the user in introducing the system of the present example embodiment is small. However, the management of authority information, viewing of electronic files, and the like of the present example embodiment may be performed by dedicated software.

Further, in the present example embodiment, since the log is automatically generated at the time of viewing, it is possible to record that the user who should view the electronic file actually viewed the electronic file. The viewing confirmation function may be further added by a method such as transmitting information including the user who viewed, the viewed time, or the like stored in the log to the creator of the electronic file. Since this viewing confirmation function is based on the result of comparison by a face image, unlike the opening confirmation function of an electronic mail or the like, certainty has been improved in that it is guaranteed that another person did not view by pretending to be the person. Further, the presence or absence of forgery and falsification of the document can be verified later by recording the presence or absence of editing together with the user who viewed the log.

Further, in the present example embodiment, since the information of the viewing authority is set for the electronic file, even if the electronic file is distributed against the will of the creator of the electronic file, the electronic file cannot be viewed by persons other than those set in advance. Therefore, the security is improved. In addition, even when the electronic file is stored in a server that can be accessed by a large number of persons, no person other than the set person can view the electronic file, so that information leakage can be prevented.

On the other hand, in the present example embodiment, since the information of the viewing authority is set not on the hardware side for viewing the electronic file but on the electronic file, appropriate authority setting is performed even when the user views the electronic file by unspecified plurality of terminals.

Further, in the present example embodiment, as compared with the method of performing an identity confirmation at the time of a login to a terminal, the comparison for the identity confirmation is continued even after the login, so that the security is improved.

In the present example embodiment, the reason why the viewing authority is set in two stages, that is, an individual user and a group (attribute) such as the user's affiliation, position, or the like, will be described. In some cases, the viewing authority of the electronic file is determined according to the individual circumstances of the user, but in other cases, the viewing authority is determined according to the work of the department to which the user belongs or the position of the user.

For example, according to FIGS. 6 and 7, the user "CCC" belongs to the A division and has the viewing authority of the electronic file. Here, if the user "CCC" is transferred to the B division, it is desirable that the viewing authority of the user "CCC" of the electronic file such as the policy statement of the A division be deleted. However, it may be troublesome to delete the viewing authority of the user "CCC" from all the electronic files. Therefore, as illustrated in FIG. 6, if the authority of the group "B division" is set to "Deny", even if the "Allow" of the user "CCC" is not deleted, the "Deny" of the group "B division" automatically loses the viewing authority of the user "CCC".

For this reason, in the present example embodiment, the viewing authority is set based on the attribute of the person in advance, and the processing by the viewing prevention unit 107 is performed based on the viewing authority corresponding to the attribute of the comparison target person. Thus, the labor for resetting the authority caused by the change of the attribute such as the transfer of the user is reduced.

Second Example Embodiment

Figure 14:
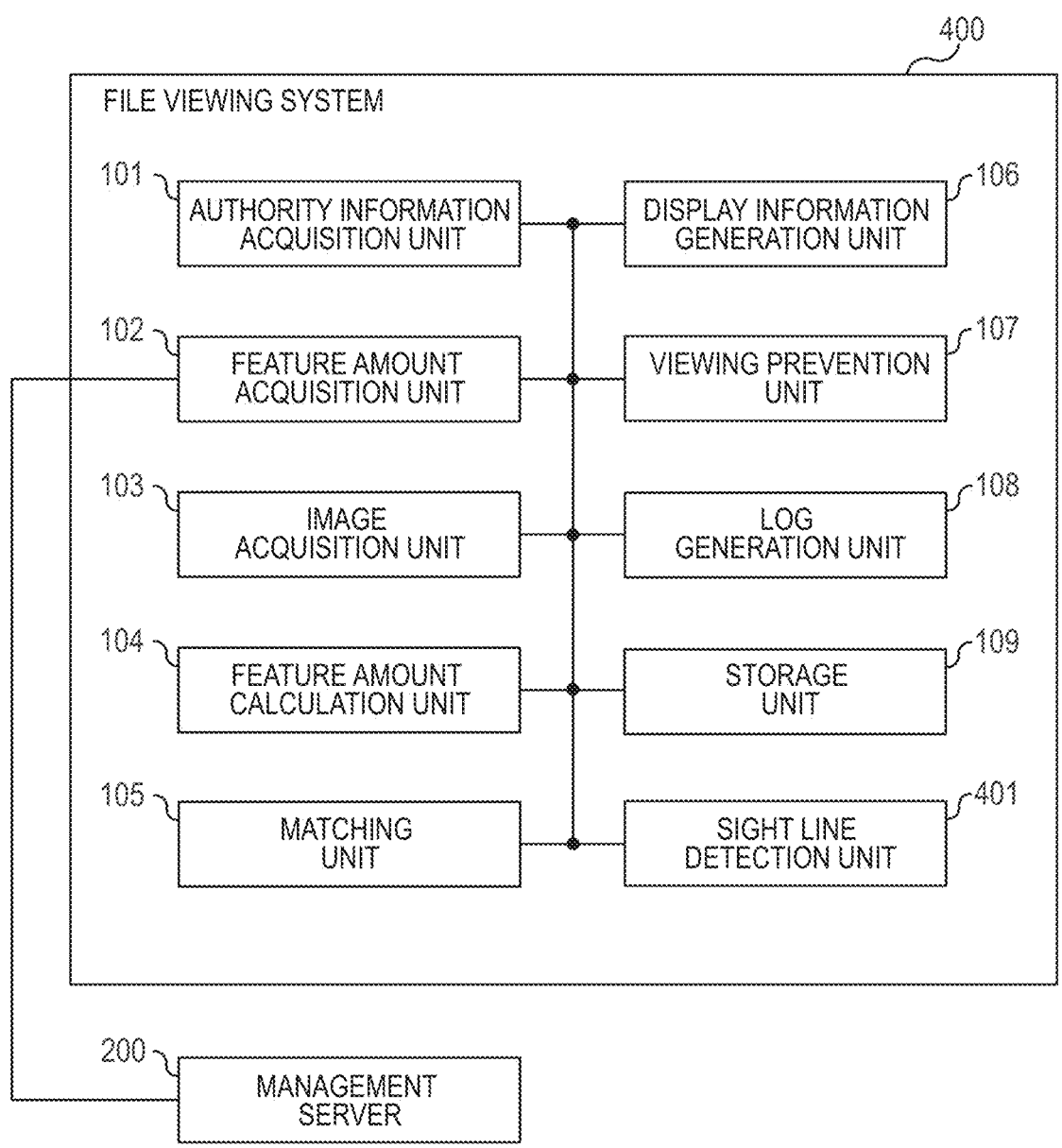
FIG. 14 is a function block diagram of a file viewing system according to the second example embodiment.

A file viewing system 400 according to the present example embodiment will be described with reference to FIGS. 14 and 15. FIG. 14 is a function block diagram of the file viewing system 400 according to the present example embodiment. As illustrated in FIG. 14, the file viewing system 400 of the present example embodiment further includes a sight line detection unit 401. The CPU 151 implements a function of the sight line detection unit 401 by executing the program. Configurations other than the addition of the sight line detection unit 401 and the processing performed by the sight line detection unit 401 are the same as those of the first example embodiment, and therefore the description thereof is omitted.

Figure 15:
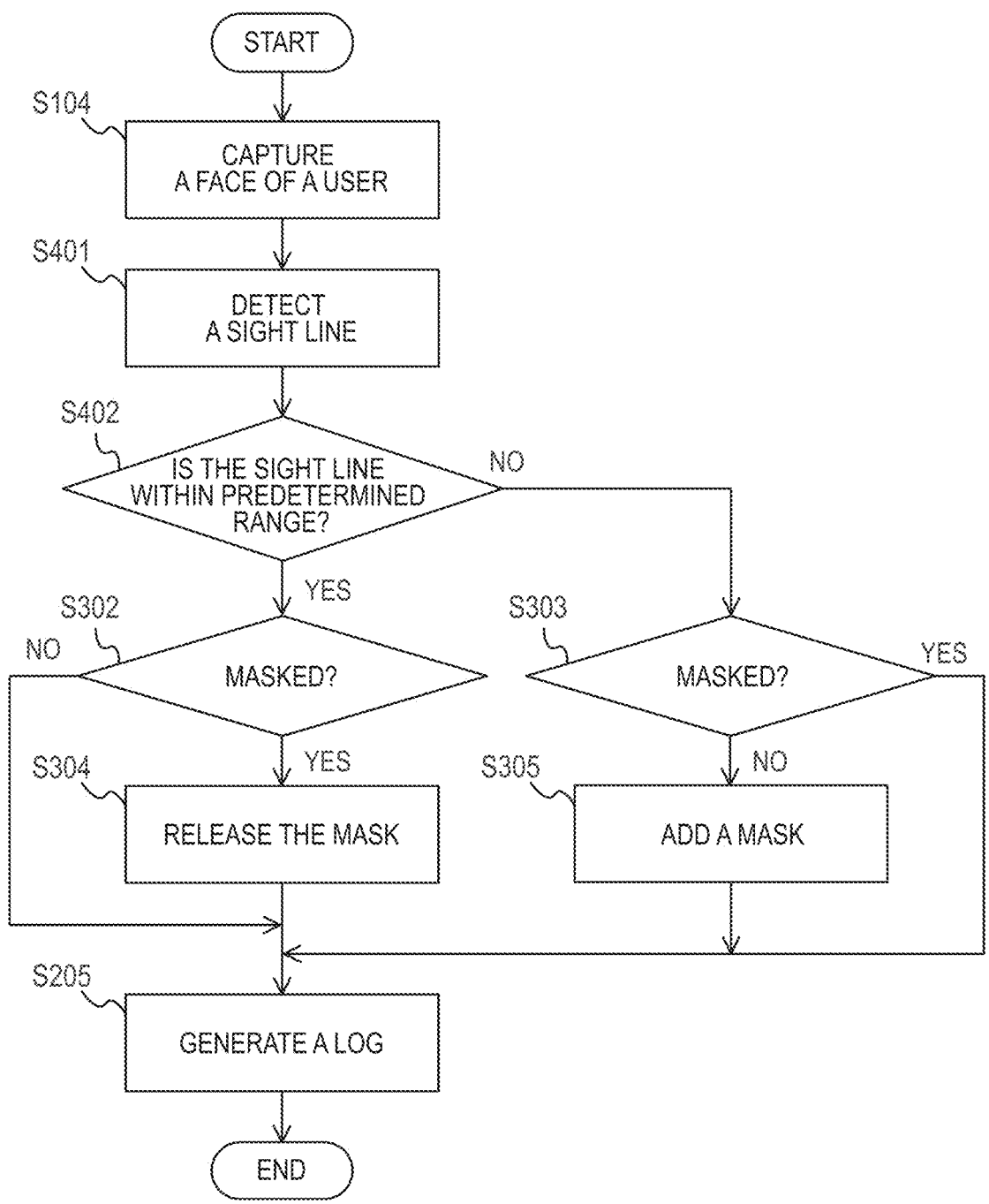
FIG. 15 is a flowchart illustrating a process performed during viewing by the file viewing system according to the second example embodiment.

FIG. 15 is a flowchart illustrating a process of detecting a sight line during viewing performed by the file viewing system 400. The series of processes illustrated in FIG. 15 is performed in step S16 of FIG. 4 in parallel with the face recognition process. This process may be performed during the face recognition process that is repeatedly performed, or may be incorporated into the flow of the face recognition process.

In step S104, the image acquisition unit 103 captures the face image of the user. This face image is used for the sight line detection. Since this process is the same as step S104 in FIGS. 5 and 13, a detailed description thereof is omitted.

In step S401, the sight line detection unit 401 detects the user's eye from the user's face image, and detects a direction, position, or the like of the user's sight line based on a positional relationship between a position of the iris and feature parts such as the outer and inner corners of the eyes. Note that the method of the sight line detection is not limited to this, and various sight line detection techniques can be applied.

In step S402, the sight line detection unit 401 determines whether the position of the sight line is within a predetermined range. If the position of the sight line is within a predetermined range (step S402, YES), the process proceeds to step S302. If the position of the sight line is out of the predetermined range (step S402, NO), the process proceeds to step S303. Since the subsequent processes are the same as that illustrated in FIG. 13, the description thereof is omitted.

The predetermined range is typically a range of content displayed in the display area of the display device 156. In this case, the mask pattern is not displayed when the user is looking at the content, but the mask pattern is displayed when the user is not looking at the content. In consideration of errors in sight line detection, a range wider than the above range may be set as a predetermined range, for example, the predetermined range may be the entire display area of the display device 156.

According to the present example embodiment, the same effects as those of the first example embodiment can be obtained. Further, in the present example embodiment, since the viewing of the content is automatically prevented when the sight line is away from the content, the possibility that the content of the electronic file is viewed by another person is reduced when the user does another work such as answering a telephone while the content is displayed. Therefore, security is further improved.

The log generation unit 108 may further record the result of the sight line detection in the log. For example, it is possible to record whether or not the user has seen the predetermined place by recording whether or not the sight line has been directed to a specific place in the content. For example, by setting a portion in the document to be checked in the predetermined portion and transmitting the information recorded in the log to the creator of the electronic file, the creator of the document can confirm whether or not the specific portion has been seen.

In the present example embodiment, although an example in which the sight line detection technique by the sight line detection unit 401 is adopted has been described, the process of the present example embodiment can be similarly realized even in the case where other techniques are used, as long as the direction, the place, or the like of the attention of the user can be discriminated. For example, instead of the sight line detection, a face direction detection for detecting a face direction from a face image may be adopted.

Third Example Embodiment

Figure 16:
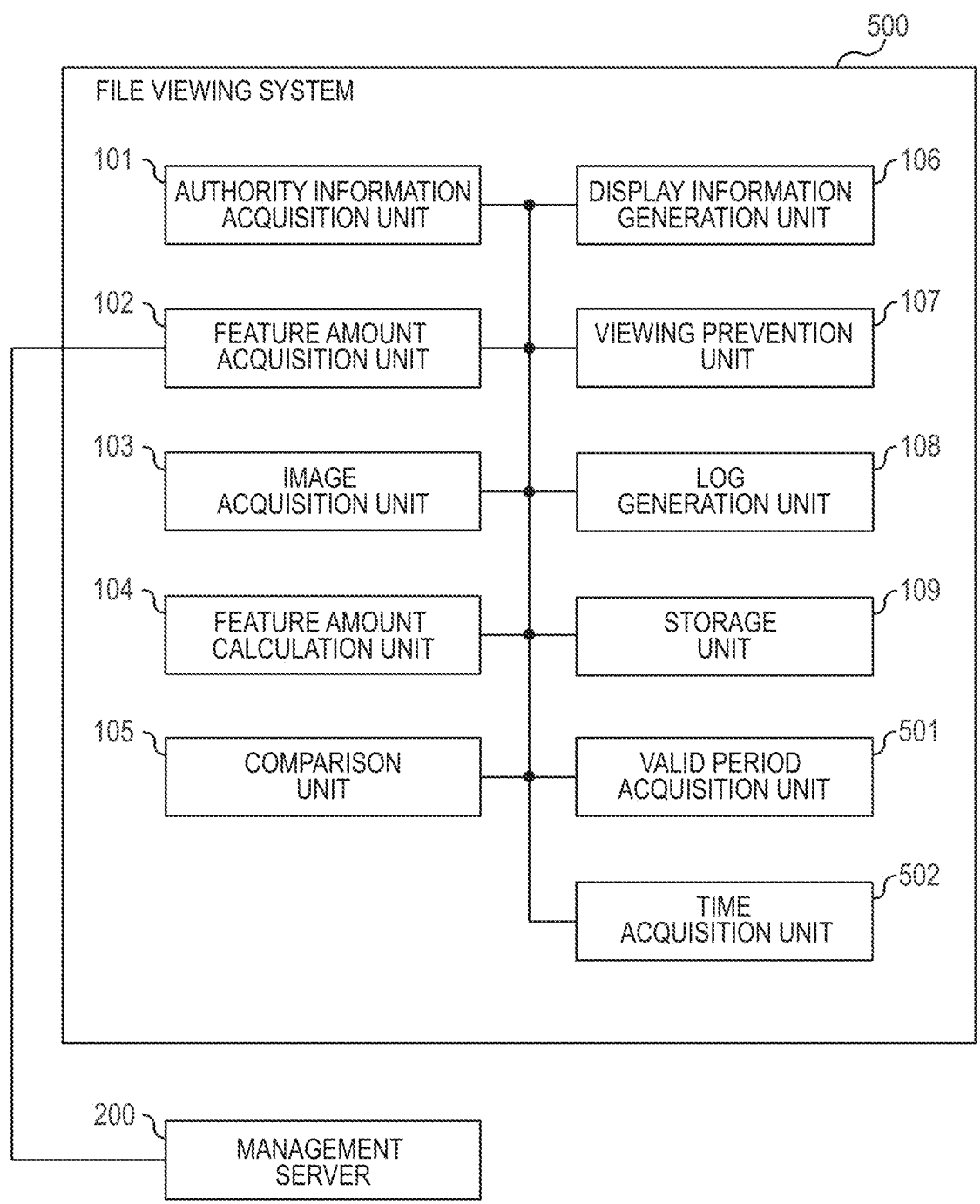
FIG. 16 is a function block diagram of a file viewing system according to the third example embodiment.

A file viewing system 500 according to the present example embodiment will be described with reference to FIGS. 16 and 17. FIG. 16 is a function block diagram of the file viewing system 500 according to the present example embodiment. As illustrated in FIG. 16, the file viewing system 500 of the present example embodiment further includes a valid period acquisition unit 501 and a time acquisition unit 502. The CPU 151 implements the functions of the valid period acquisition unit 501 and the time acquisition unit 502 by executing the program. Configurations other than the addition of the valid period acquisition unit 501 and the time acquisition unit 502 and the processes related thereto are the same as those of the first embodiment, and therefore the description thereof is omitted.

Figure 17:
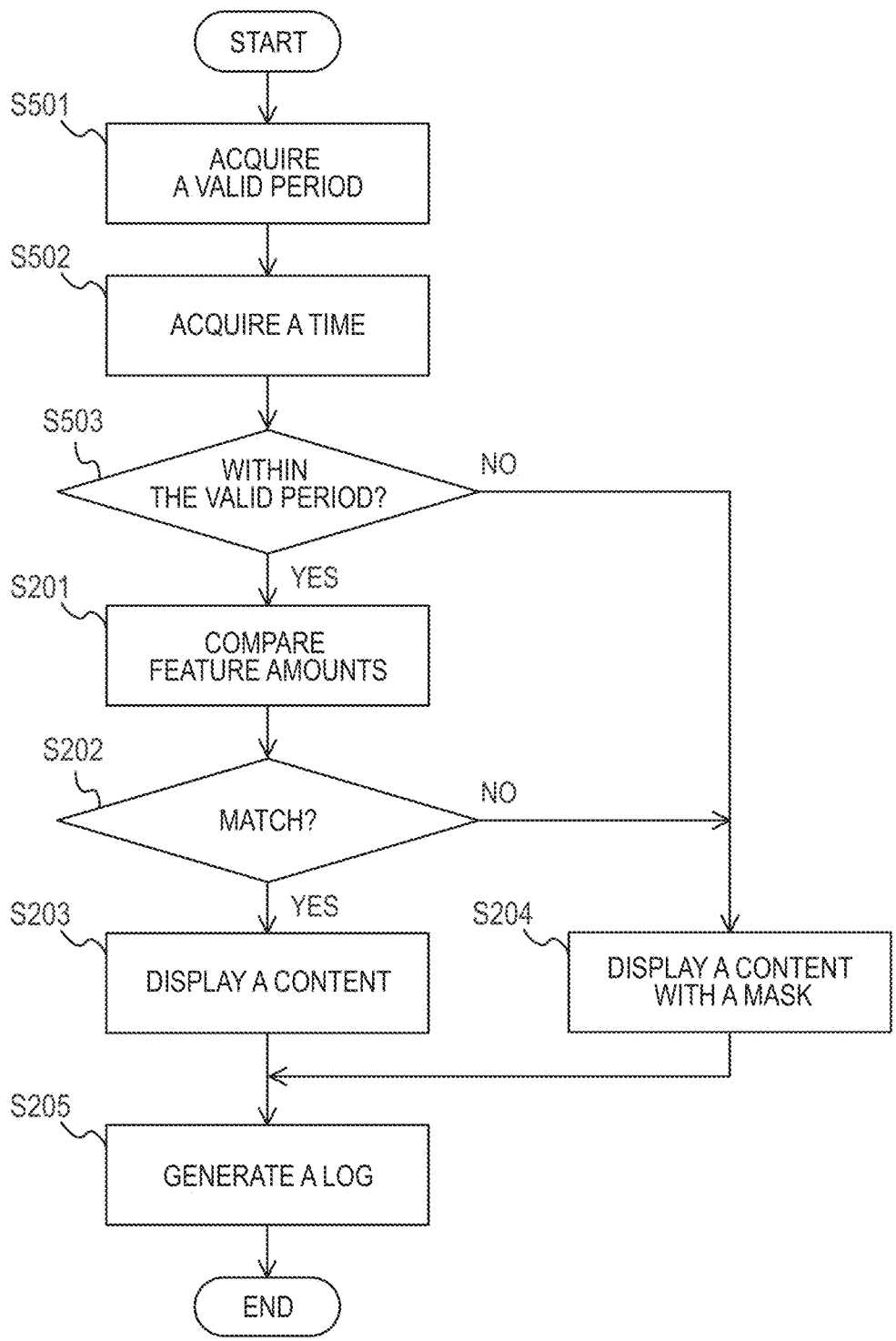
FIG. 17 is a flowchart illustrating a process performed before the start of viewing by the file viewing system according to the third example embodiment.

FIG. 17 is a flowchart illustrating the face recognition process performed by the file viewing system 500 before the start of viewing. The series of processes illustrated in FIG. 17 corresponds to step S15 in FIG. 4 and is obtained by adding processes of steps S501 to S503 to FIG. 8.

In step S501, the valid period acquisition unit 501 acquires the valid period of the electronic file. Here, the valid period is a period in which electronic file can be viewed and is set for each electronic file. The information indicating the valid period may be stored in an electronic file to be viewed or may be stored in a setting file different from the electronic file to be viewed. The valid period may be set in the form of a period between the start time and the end time, or may be set only by one of the start time and the end time.

In step S502, the time acquisition unit 502 acquires the current time. The time acquisition unit 502 can acquire the current time from, for example, a timer provided in the file viewing system 100 or the management server 200.

In step S503, the CPU 151 determines whether or not the current time is within the valid period. If the current time is within the valid period (step S503, YES), the process proceeds to step S201. If the current time is outside the valid period (step S503, NO), the process proceeds to step S204. Since the subsequent processes are the same as those in FIG. 8, the description thereof is omitted.

Note that, in the present example embodiment, the recognition process during viewing can be performed in the same manner as in FIG. 13, but when the current time is outside the valid period, the process of releasing the process of preventing viewing of the electronic file in step S304 is not performed.

According to the present example embodiment, the same effects as those of the first example embodiment can be obtained. Furthermore, in the present example embodiment, it is possible to prevent the electronic file from being viewed at a time that is not desired by the creator of the electronic file, such as a time after the valid period has elapsed. For example, even if the distributed file is redistributed against the creator's will, the electronic file automatically becomes unviewable after the expiration of the valid period. In addition, even if the content includes information that is desired to be kept secret without being disclosed until a certain time, such as a press release material, by setting the start time of the valid period, the confidentiality can be maintained until the start time of the valid period is passed. As described above, according to the present example embodiment, security and convenience are further improved.

The systems described in the above example embodiments can be configured as with a fourth example embodiment below.

Fourth Example Embodiment

Figure 18:
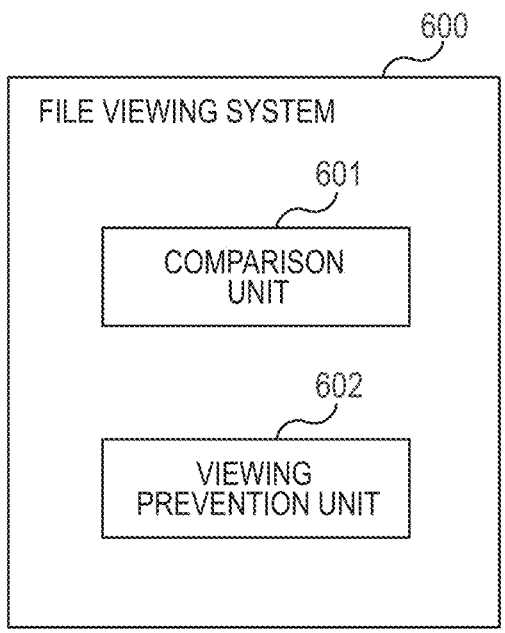
FIG. 18 is a function block diagram of a file viewing system according to the fourth example embodiment.

FIG. 18 is a function block diagram of the file viewing system 600 according to the fourth example embodiment. A file viewing system 600 includes a comparison unit 601 and a viewing prevention unit 602. The comparison unit 601 compares biometric information of a comparison target person with biometric information of a person associated with an electronic file. The viewing prevention unit 602 performs a process for preventing viewing of the electronic file based on a result of a comparison by the comparison unit 601.

According to the present example embodiment, a file viewing system 600 with improved convenience in a security protection of electronic files is provided.

Modified Example Embodiments

The present invention is not limited to the example embodiment described above but can be changed as appropriate within a range not departing from the spirit of the present invention.

In the example embodiments described above, it is assumed that the image pickup device 158 is integrated with the computer, but the example embodiments are not limited to this, as long as the user can be captured. For example, the same processes as those of the image pickup device 158 of the above-described example embodiments may be realized by capturing the user with a network connection camera installed in an office. With this configuration, the processes of the above-described example embodiments can be realized even in a hardware environment in which the image pickup device 158 is not provided in each computer. It is also possible to cover multiple users in the same office by installing one camera.

In the above-described example embodiments, it is assumed that the number of users to be compared is one, but the number of comparison target persons is not limited to one and may be plural. For example, the above-described example embodiments can also be applied to a situation where a plurality of persons are simultaneously looking at the display area of the display device 156 to view the electronic file. In this case, it is preferable that the viewing prevention unit 107 performs a process for preventing viewing of the electronic file when at least one of the plurality of comparison target persons does not have viewing authority. Thus, even when a second user who does not have the viewing authority approaches to view the electronic file while a first user who has the viewing authority tries to view the electronic file, the viewing by the second user can be prevented.

In the above-described example embodiments, when the content is a request for approval or the like having a signature field such as a confirmation field and an approval field, information indicating whether or not the person to be signed actually signed may be recorded in the log based on whether or not the result of the face recognition is the same as the person to be signed. In this case, evidence indicating that the signer is identical to the person to be signed can be left. In this method, because the identity is confirmed by biometric recognition, a possibility of impersonation by others is reduced in comparison with conventional methods such as a password and an electronic signature. Further, by using the mask pattern 303 illustrated in FIG. 11 and varying the range of the mask pattern 303 according to the job title, the signer can view an appropriate range such as the confirmation field and the approval field according to the job title of the signer using one electronic file.

In the above-described example embodiments, the management server 200 of the embodiments stores a face image associated with a user for face recognition. Therefore, the function of displaying a face image of a candidate may be provided in the interface for setting the authority performed when the electronic file is created or the like. Since the user can set the authority while looking at the face image by setting the authority by using this interface, the authority can be set even for a person whose exact name is not known, such as a person who only attended the meeting. Further, it is possible to prevent a setting error that may occur when there are persons with the same full name.

In the above-described example embodiments, the determination of matched or not matched in the face recognition can be performed based on whether the similarity degree between the two amounts exceeds a predetermined threshold serving as a reference for the comparison, for example. The set value of the threshold may vary depending on the situation.

Figure 19:
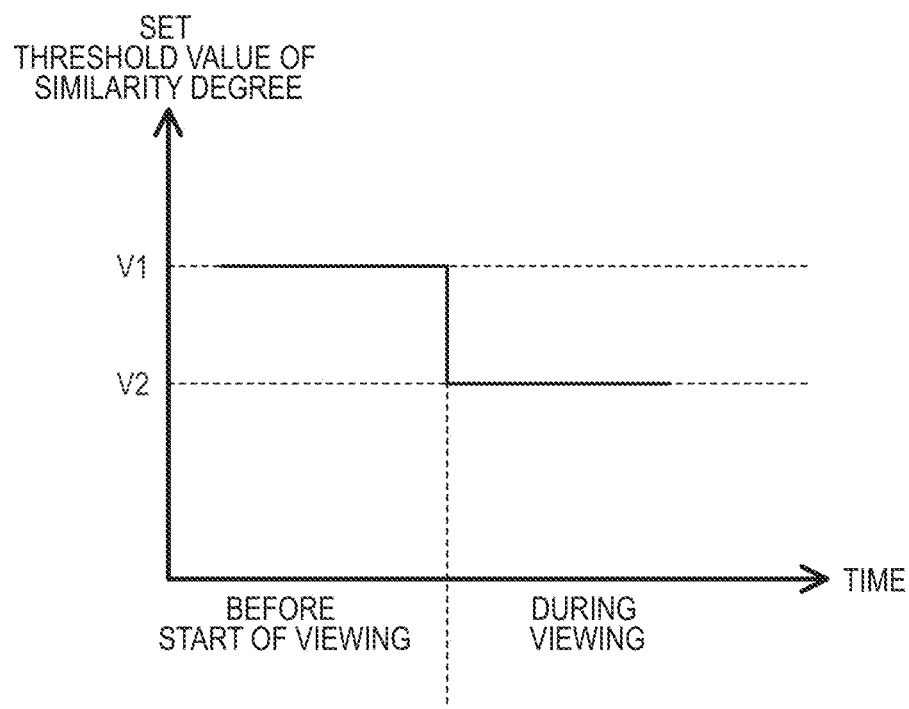
FIG. 19 is a graph illustrating an example of a change in the threshold setting for a similarity degree.

FIG. 19 is a graph illustrating an example of a change in the threshold setting for the similarity degree. A threshold when an operation for viewing is executed as in the comparison before the start of viewing in step S15 of FIG. 4 (first comparison) is set to V1, and a threshold of the viewable period as in the comparison during viewing in step S16 of FIG. 4 (second comparison) is set to V2. At this time, as illustrated in FIG. 19, the threshold V1 is set to a value greater than the threshold V2.

The first comparison is to determine whether or not the user may view the content, and it is necessary to perform a reliable identity confirmation, so that the threshold V1 needs to be a relatively high value. On the other hand, in the second comparison, since it is determined whether or not the situation in which the propriety of the viewing of the content to the user is to be modified has changed, the accuracy of the identity confirmation is not required so much. On the contrary, if the accuracy is too high, it becomes impossible to view suddenly in the middle of viewing, thereby impairing convenience. Therefore, by setting the threshold V1 to a value greater than the threshold V2, both accuracy and convenience can be achieved.

As described above, when the number of comparison target persons is plural, the electronic file displayed on the same display device 156 can be viewed at the same time when the plurality of users all have the viewing authority. At this time, if at least one of the plurality of users takes his or her eyes away from the electronic file or the like, and the face of the user is not captured from the front, the similarity degree in face comparison of the user may be lowered. When the similarity degree is lowered due to such a factor, even the user who actually has the viewing authority is determined not to be the same person as the person of the registered face image due to the lowering of the similarity degree, and viewing of the electronic file is prevented. In this case, not only the user who takes his or her eyes away from the electronic file but also the other users who are looking at the electronic file cannot view the electronic file, so that the convenience may be reduced.

Therefore, when the number of the comparison target persons is plural, if more comparison target persons than the predetermined number of comparison target persons are detected and all of these comparison target persons have the viewing authority, the threshold setting value of the similarity degree may be lowered. In this case, even when a part of the users take their eyes away from the electronic file, viewing is hardly prevented, so that the decrease in convenience due to the above factors is suppressed.

Further, when the file viewing system is provided with a sight line detection function as in the second example embodiment, process for preventing viewing of the electronic file may be performed based on the number of users whose sight line positions are outside a predetermined range (outside of the content). For example, when the number of users is set to N or more, if N−1 or less users take their eyes away from the electronic file, other users are not prevented from viewing. Therefore, a decrease in convenience due to the above factors is suppressed.

Further, when the number of comparison target persons is plural, the frequency of face comparison performed during viewing may be set lower than that when the number of comparison target persons is one. By lowering the frequency of face recognition, even when a part of the users temporarily take their eyes away from the electronic file, viewing is hardly prevented, so that the decrease in convenience due to the above factors is suppressed.

In the above-described first example embodiment, the function of the file viewing system 100 is provided on the side of a user terminal such as a desktop PC, a notebook PC, or a tablet PC, but the function of face recognition of the file viewing system 100 may be provided on the management server 200 or other face recognition servers. That is, a device that performing face recognition is not limited to be provided on the user terminal side. Specific examples of methods for performing face recognition in the face recognition server include the following. The face recognition server acquires the face image or the feature amount of the user acquired in step S14 of FIG. 4 from the user terminal, and further acquires the feature amount of the person having the viewing authority from the management server 200. The face recognition server compares these feature amounts and transmits a comparison result to the user terminal. The same process as in the first example embodiment can also be realized by this method. Although this method is based on the assumption that the terminal is always connected to the network, it has an advantage that the process on the terminal side can be simplified.

The scope of each example embodiment also includes a processing method of storing, in a storage medium, a program that causes the configuration of the example embodiment to operate to implement the function of the example embodiment described above, reading out as a code the program stored in the storage medium, and executing the code in a computer. That is, a computer readable storage medium is also included in the scope of each example embodiment. Further, not only the storage medium in which the program described above is stored but also the program itself is included in each example embodiment. Further, one or more components included in the example embodiments described above may be a circuit such as an Application Specific Integrated Circuit (ASIC), a Field Programmable Gate Array (FPGA), or the like configured to implement the function of each component.

As the storage medium, a floppy (registered trademark) disk, a hard disk, an optical disk, a magneto-optical disk, a Compact Disk (CD)-ROM, a magnetic tape, a non-volatile memory card, or a ROM, for example, may be used. The scope of each example embodiment includes not only those executing a process with a program itself stored in the storage medium but also those operating on an operating system (OS) in cooperation with the function of another software or an extension board to execute the process.

Services realized by the function of each example embodiment described above can be provided to the user in a form of Software as a Service (Saas).

Note that all the example embodiments described above are mere examples of embodiment in implementing the present invention, and the technical scope of the present invention should not be limited to these example embodiments. That is, the present invention can be implemented in various forms without departing from the technical concept thereof or the primary feature thereof.

The whole or part of the example embodiments disclosed above can be described as, but not limited to, the following supplementary notes.

Supplementary Note 1

A file viewing system comprising:
a comparison unit that compares biometric information of a comparison target person with biometric information of a person associated with an electronic file; and
a viewing prevention unit that performs a process for preventing viewing of the electronic file based on a result of a comparison by the comparison unit.

Supplementary Note 2

The file viewing system according to supplementary note 1, wherein the comparison unit performs the comparison when the comparison target person performs an operation for viewing the electronic file.

Supplementary Note 3

The file viewing system according to supplementary note 1 or 2, wherein the comparison unit performs the comparison after the comparison target person performs an operation for viewing the electronic file and during a period when the comparison target person can view the electronic file.

Supplementary Note 4

The file viewing system according to any one of supplementary notes 1 to 3, wherein the viewing prevention unit performs a process for preventing the comparison target person from viewing the electronic file by displaying a mask pattern that is overlaid on a content of the electronic file displayed on a display device and that prevents the content from being viewed.

Supplementary Note 5

The file viewing system according to supplementary note 4, wherein the mask pattern includes a message for the comparison target person.

Supplementary Note 6

The file viewing system according to supplementary note 4 or 5, wherein the mask pattern includes contact information for requesting a viewing of the electronic file.

Supplementary Note 7

The file viewing system according to any one of supplementary notes 1 to 6,
wherein the content of the electronic file includes a first portion to which a viewing restriction for the comparison target person is applied and a second portion to which a viewing restriction for the comparison target person is not applied, and wherein the viewing prevention unit performs a process for preventing the comparison target person from viewing the electronic file only in the first portion.

Supplementary Note 8

The file viewing system according to supplementary note 7, wherein the first portion and the second portion are divided based on a degree of confidentiality of the content.

Supplementary Note 9

The file viewing system according to any one of supplementary notes 1 to 8 further comprising a log generation unit that generates a log including information indicating that the comparison target person has viewed the electronic file based on a result of a comparison by the comparison unit.

Supplementary Note 10

The file viewing system according to supplementary note 9,
wherein the content of the electronic file includes a signature field, and
wherein the log includes information indicating whether or not the person to sign the signature field is the comparison target person.

Supplementary Note 11

The file viewing system according to any one of supplementary notes 1 to 10 further comprising a sight line detection unit that detects a sight line of the comparison target person,
wherein the viewing prevention unit performs a process for preventing the comparison target person from viewing the electronic file based on the sight line.

Supplementary Note 12

The file viewing system according to supplementary note 11, wherein the viewing prevention unit performs a process for preventing the comparison target person from viewing the electronic file when the sight line is outside the content of the electronic file.

Supplementary Note 13

The file viewing system according to supplementary note 11 or 12 further comprising a log generation unit that generates a log indicating whether or not the comparison target person has viewed a predetermined portion of the content of the electronic file based on the sight line.

Supplementary Note 14

The file viewing system according to any one of supplementary notes 1 to 13,
wherein viewing authority of the person is set based on an attribute of the person, and
wherein the viewing prevention unit performs a process for preventing the comparison target person from viewing the electronic file based on the viewing authority corresponding to the attribute of the comparison target person.

Supplementary Note 15

The file viewing system according to supplementary note 14, wherein the attribute of the comparison target person includes at least one of an affiliation of the comparison target person and a job title of the comparison target person.

Supplementary Note 16

The file viewing system according to any one of supplementary notes 1 to 15,
wherein the comparison unit performs a comparison for each of a plurality of comparison target persons who intend to view the electronic file;
wherein the viewing prevention unit performs a process for preventing viewing of the electronic file when at least one of the plurality of comparison target persons does not have viewing authority;

Supplementary Note 17

The file viewing system according to supplementary note 16 further comprising a sight line detection unit that detects a sight line of each of the plurality of comparison target persons,
wherein the viewing prevention unit performs a process for preventing viewing of the electronic file based on the number of comparison target persons whose sight line is outside the content of the electronic file.

Supplementary Note 18

The file viewing system according to any one of supplementary notes 1 to 17 further comprising:
a valid period acquisition unit that acquires a valid period set in the electronic file; and
a time acquisition unit that acquires a current time,
wherein the viewing prevention unit performs a process for preventing the comparison target person from viewing the electronic file when the current time is outside the valid period.

Supplementary Note 19

The file viewing system according to any one of supplementary notes 1 to 18,
wherein the comparison unit performs a first comparison when the comparison target person performs an operation for viewing the electronic file, and performs a second comparison during a period when the comparison target person can view the electronic file, and
wherein, in the first comparison and the second comparison, thresholds that are references for comparison of the comparison target person is different from each other.

Supplementary Note 20

The file viewing system according to any one of supplementary notes 1 to 19, wherein the biometric information is a face image of the comparison target person or a feature amount generated from a face image of the comparison target person.

Supplementary Note 21

A file viewing method comprising:
comparing biometric information of a comparison target person with biometric information of a person associated with an electronic file; and performing a process for preventing viewing of the electronic file based on a result of the comparison.

Supplementary Note 22

A storage medium in which a program is stored, the program causing a computer to execute a file viewing method comprising:
comparing biometric information of a comparison target person with biometric information of a person associated with an electronic file; and
performing a process for preventing viewing of the electronic file based on a result of the comparison.

This application is based upon and claims the benefit of priority from Japanese Patent Application No. 2018-164213, filed on Sep. 3, 2018, the disclosure of which is incorporated herein in its entirety by reference.

REFERENCE SIGNS LIST 100, 400, 500, 600 file viewing system
101 authority information acquisition unit
102 feature amount acquisition unit
103 image acquisition unit
104 feature amount calculation unit
105, 601 comparison unit
106 display information generation unit
107, 602 viewing prevention unit
108 log generation unit
109 storage unit
151 CPU
152 RAM
153 ROM
154 HDD
155 communication I/F
156 display device
157 input device
158 image pickup device
159 bus
200 management server
301 slide
302, 303, 304 mask pattern
305, 306 message
401 sight line detection unit
501 valid period acquisition unit
502 time acquisition unit
V1, V2 threshold

The invention claimed is:

1. A user terminal comprising:
a camera;
a touch panel configured to display information and receive input by a user;
at least one memory storing instructions; and
at least one processor configured to execute the instructions to:
derive information regarding a face for authentication based on a first image which is captured by the camera;
perform authentication of the user based on the information regarding the face;
display content on the touch panel in response to the authentication using the information regarding the face, wherein a kind of the content includes at least one of a document, a spreadsheet, a station slide, a drawing, program code or a video; and
continue to display the content on the touch panel based on a state of the user,
wherein the state of the user is determined based on one or more images captured by the camera, and
wherein the touch panel is controlled such that the content is not displayed based on the state of the user indicating the user is not looking at the touch panel.

2. The user terminal according to claim 1, wherein the authentication is configured to compare the information regarding the face with a second image, the second image being captured by the camera.

3. The user terminal according to claim 1, wherein the process of controlling to not display the content on the touch panel includes controlling the touch panel to hide the content.

4. The user terminal according to claim 1, wherein the process of controlling to not display the content on the touch panel includes controlling the touch panel to change display to not display the content on the touch panel.

5. The user terminal according to claim 1, wherein the process of controlling to not display the content on the touch panel includes controlling the touch panel to turn off.

6. The user terminal according to claim 5, wherein the process of turning off the touch panel includes shut down.

7. The user terminal according to claim 1, wherein the camera is installed in an outer frame of a display area, the display area being a part of the touch panel.

8. The user terminal according to claim 1, wherein the content is displayed on the touch panel used by software for displaying the content.

9. A control method, performed by a user terminal including a camera and a touch panel for displaying information and for receiving input by a user, the control method comprising:
deriving information regarding a face for authentication based on a first image which is captured by the camera;
performing authentication of the user based on the information regarding the face;
displaying content on the touch panel in response to the authentication using the information regarding the face, wherein a kind of the content includes at least one of a document, a spreadsheet, a presentation slide, drawing, program code or a video; and
continuing to display the content on the touch panel based on a state of the user,
wherein the state of the user is determined based on one or more images captured by the camera, and
wherein the touch panel is controlled such that the content is not displayed based on the state of the user indicating the user is not looking at the touch panel.

10. The control method according to claim 9, wherein the authentication is configured to compare the information regarding the face with a second image, the second image being captured by the camera.

11. The control method according to claim 9, wherein the process of controlling to not display the content on the touch panel includes controlling the touch panel to hide the content.

12. The control method according to claim 9, wherein the process of controlling to not display the content on the touch panel includes controlling the touch panel to change display to not display the content on the touch panel.

13. The control method according to claim 9, wherein the process of controlling to not display the content on the touch panel includes controlling the touch panel to turn off.

14. The control method according to claim 13, wherein the process of turning off the touch panel includes shut down.

15. The control method according to claim 9, wherein the camera is installed in an outer frame of a display area, the display area being a part of the touch panel.

16. The control method according to claim 9, wherein the content is displayed on the touch panel used by software for displaying the content.

\* \* \* \* \*